US011310863B2

(12) United States Patent
Ingale et al.

(10) Patent No.: US 11,310,863 B2
(45) Date of Patent: *Apr. 19, 2022

(54) METHOD AND APPARATUS FOR DETERMINING TDD UL-DL CONFIGURATION APPLICABLE FOR RADIO FRAMES

(71) Applicant: Samsung Electronics Co., Ltd., Gyeonggi-do (KR)

(72) Inventors: Mangesh Abhimanyu Ingale, Bangalore (IN); Sudhir Kumar Baghel, Bangalore (IN); Soeng-Hun Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 77 days.

This patent is subject to a terminal disclaimer.

(21) Appl. No.: 16/899,091

(22) Filed: Jun. 11, 2020

(65) Prior Publication Data

US 2020/0305222 A1 Sep. 24, 2020

Related U.S. Application Data

(63) Continuation of application No. 16/725,490, filed on Dec. 23, 2019, which is a continuation of application (Continued)

(30) Foreign Application Priority Data

Jul. 6, 2012 (IN) ........................... 2749/CHE/2012

(51) Int. Cl.
*H04J 3/00* (2006.01)
*H04W 76/28* (2018.01)
(Continued)

(52) U.S. Cl.
CPC .......... *H04W 76/28* (2018.02); *H04B 7/2615* (2013.01); *H04L 5/1476* (2013.01); *H04W 72/042* (2013.01); *H04W 72/0406* (2013.01)

(58) Field of Classification Search
CPC ...... H04B 1/56; H04B 7/2656; H04B 7/2615; H04W 72/0446; H04W 88/08;
(Continued)

(56) References Cited

U.S. PATENT DOCUMENTS 7,966,017 B2 * 6/2011 Kim ................. H04W 52/0216
455/574
8,149,749 B2 * 4/2012 Maeda ................. H04W 72/04
370/328
(Continued)

FOREIGN PATENT DOCUMENTS

EP 0 948 184 10/1999
EP 1 715 712 10/2006
(Continued)

OTHER PUBLICATIONS

U.S. Appl. No. 16/725,490, Amended claims 1-2, 4-5, 4-7,9-12, 14-17, and 19-20, filed Sep. 3, 2021, pp. 1-4. (Year: 2021).*
(Continued)

*Primary Examiner* — Phuongchau Ba Nguyen
(74) *Attorney, Agent, or Firm* — The Farrell Law Firm, P.C.

(57) ABSTRACT

Methods and apparatuses are provided for monitoring a physical downlink control channel (PDCCH) in a wireless communication system. A UE receives a system information block (SIB) from a base station. The UE obtains a first time division duplex (TDD) uplink (UL)/downlink (DL) configuration from the SIB. The UE identifies DL subframes in a radio frame. The UE monitors the PDCCH transmitted from the base station on a DL subframe included in an on duration
(Continued)

period of a discontinuous reception (DRX) cycle. The UE obtains information about a second TDD UL/DL configuration from the monitored PDCCH. The UE applies the second TDD UL/DL configuration to the radio frame. The DL subframe corresponds to a predetermined subframe number in the radio frame. The on duration period represents a period corresponding to a predetermined number of subframes from a subframe where the DRX cycle starts, and the on duration period is repeated periodically.

16 Claims, 11 Drawing Sheets

Related U.S. Application Data

No. 16/272,361, filed on Feb. 11, 2019, now Pat. No. 10,517,137, which is a continuation of application No. 14/413,177, filed as application No. PCT/KR2013/006052 on Jul. 8, 2013, now Pat. No. 10,206,244.

(51) Int. Cl.
*H04B 7/26* (2006.01)
*H04L 5/14* (2006.01)
*H04W 72/04* (2009.01)

(58) Field of Classification Search
CPC . H04W 76/02; H04W 76/28; H04W 72/0406; H04W 72/042; H04L 5/1476
See application file for complete search history.

(56) References Cited

U.S. PATENT DOCUMENTS

| | | | |
|---|---|---|---|
| 8,169,957 B2* | 5/2012 | Damnjanovic ... | H04W 52/0216 370/437 |
| 9,219,595 B2 | 12/2015 | Yin | |
| 10,206,244 B2* | 2/2019 | Ingale ............... | H04W 72/0406 |
| 10,517,137 B2* | 12/2019 | Ingale ................. | H04W 76/28 |
| 2008/0225062 A1 | 9/2008 | Chang et al. | |
| 2009/0259909 A1 | 10/2009 | Luo | |
| 2010/0110897 A1 | 5/2010 | Chun et al. | |
| 2010/0190488 A1* | 7/2010 | Jung ..................... | H04W 24/10 455/424 |
| 2010/0234037 A1* | 9/2010 | Terry ..................... | H04L 5/003 455/450 |
| 2010/0322118 A1 | 12/2010 | Fang | |
| 2011/0038275 A1 | 2/2011 | Kim et al. | |
| 2011/0038277 A1 | 2/2011 | Hu et al. | |
| 2011/0039568 A1* | 2/2011 | Zhang ................... | H04W 52/50 455/452.1 |
| 2011/0103288 A1* | 5/2011 | Lee ........................ | H04W 4/90 370/312 |
| 2011/0199951 A1 | 8/2011 | Kwon et al. | |
| 2011/0237266 A1* | 9/2011 | Cai ....................... | H04W 76/28 455/450 |
| 2011/0273996 A1 | 11/2011 | Kim et al. | |
| 2011/0292854 A1* | 12/2011 | Terry .................... | H04L 5/0055 370/329 |
| 2011/0294491 A1* | 12/2011 | Fong ..................... | H04L 5/0098 455/422.1 |
| 2012/0057490 A1* | 3/2012 | Park ...................... | H04W 76/28 370/252 |
| 2012/0077554 A1 | 3/2012 | Ahn et al. | |
| 2012/0078933 A1 | 3/2012 | Kim et al. | |
| 2012/0082049 A1* | 4/2012 | Chen ....................... | H04L 43/06 370/252 |
| 2012/0099491 A1* | 4/2012 | Lee ......................... | H04L 5/0053 370/280 |
| 2012/0147020 A1 | 6/2012 | Hussain et al. | |
| 2012/0155355 A1* | 6/2012 | Kwon .................... | H04W 76/28 370/311 |
| 2013/0044652 A1 | 2/2013 | Wang | |
| 2013/0083710 A1 | 4/2013 | Chen | |
| 2014/0010213 A1 | 1/2014 | Wang | |
| 2014/0029565 A1* | 1/2014 | Kim ....................... | H04L 5/0094 370/329 |
| 2014/0044070 A1 | 2/2014 | Chen | |
| 2015/0003384 A1* | 1/2015 | Kawasaki ............. | H04L 1/1887 370/329 |
| 2016/0056947 A1 | 2/2016 | Tiirola | |
| 2018/0176753 A1* | 6/2018 | Kim ....................... | H04L 5/0094 |
| 2019/0349799 A1* | 11/2019 | Siomina ................ | H04W 8/005 |
| 2020/0067661 A1* | 2/2020 | Siomina ............ | H04W 72/0453 |
| 2020/0204318 A1* | 6/2020 | Thangarasa .......... | H04L 5/001 |
| 2020/0213978 A1* | 7/2020 | Iyer ...................... | H04W 72/042 |
| 2020/0396687 A1* | 12/2020 | Hwang ............. | H04W 52/0229 |
| 2021/0058833 A1* | 2/2021 | Basu Mallick ... | H04W 36/0055 |
| 2021/0084586 A1* | 3/2021 | Loehr ................... | H04L 5/0057 |

FOREIGN PATENT DOCUMENTS

| | | |
|---|---|---|
| EP | 2 306 661 | 4/2011 |
| WO | WO 2007/053106 | 5/2007 |
| WO | WO 2008/024340 | 2/2008 |
| WO | WO 2009/099931 | 8/2009 |
| WO | WO 2011/034966 | 3/2011 |

OTHER PUBLICATIONS

PCT/ISA/210 Written Opinion issued on PCT/KR2013/006052 dated Oct. 16, 2013 (pp. 5).
PCT/ISA/237 Search Report issued on PCT/KR2013/006052 dated Oct. 16, 2013 (pp. 4).
Erricsson et al., 3GPP TSG-RAN WG2 #77, Dresden, Germany, Feb. 6-10, 2012, Different TDD configurations in inter-band CA, (pp. 5).
Ausutek et al., 3GPP TSG-RAN2 Meeting #76, San Francisco, US, Nov. 14-18, 2011, DRX operation with different TDD UL/DL configurations, (pp. 4).
European Search Report dated Feb. 24, 2016 issued in counterpart application No. 13813493.7-1857, 10 pages.
European Search Report dated Mar. 24, 2017 issued in counterpart application No. 16202847.6-1857, 9 pages.
European Search Report dated Feb. 21, 2019 issued in counterpart application No. 16202847.6-1215, 7 pages.

* cited by examiner

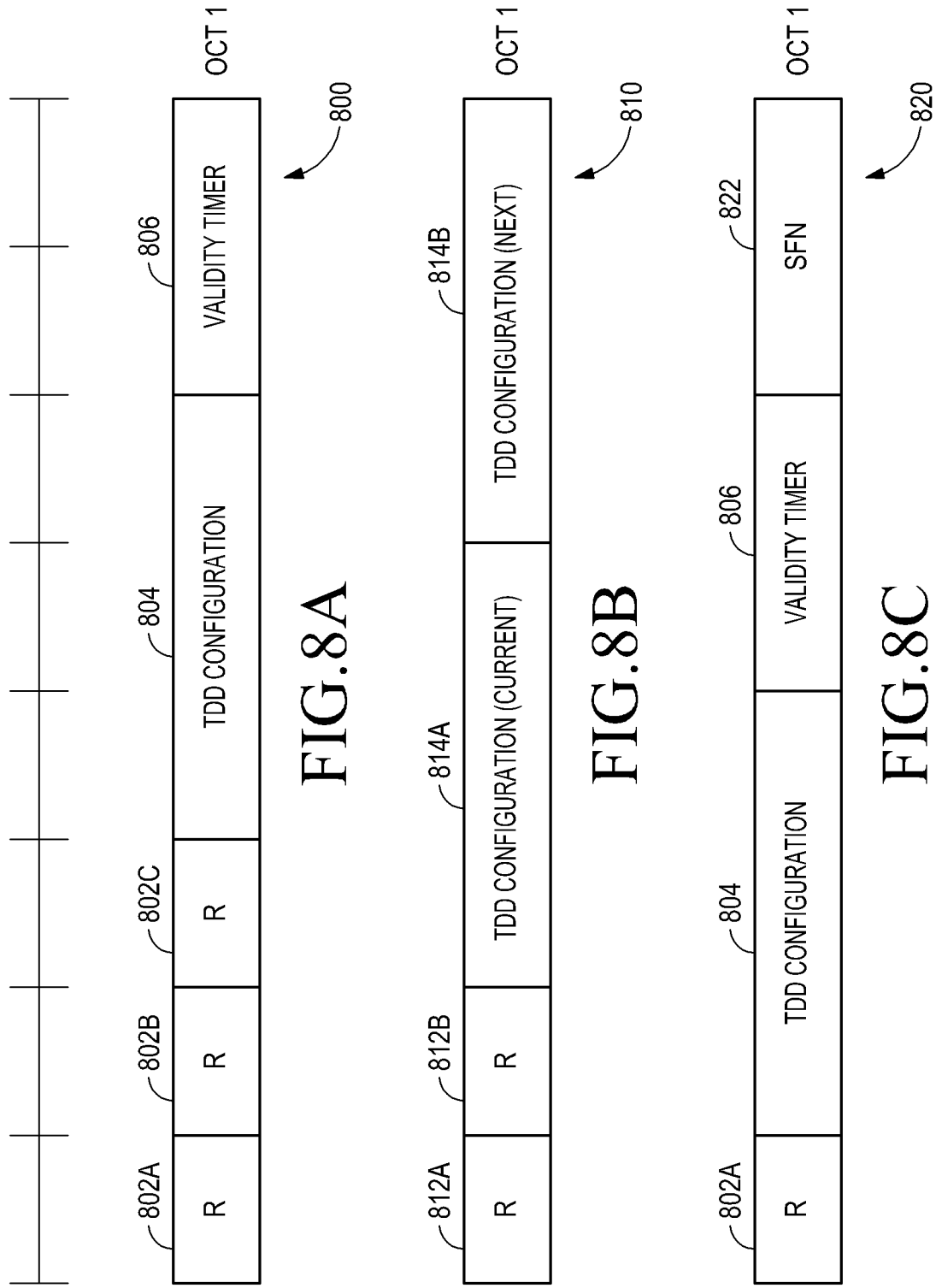

METHOD AND APPARATUS FOR DETERMINING TDD UL-DL CONFIGURATION APPLICABLE FOR RADIO FRAMES

PRIORITY

This application is a Continuation Application of U.S. patent application Ser. No. 16/725,490, filed in the U.S. Patent and Trademark Office (USPTO) on Dec. 23, 2019, which is a Continuation Application of U.S. patent application Ser. No. 16/272,361, filed in the USPTO on Feb. 11, 2019, now U.S. Pat. No. 10,517,137, issued on Dec. 24, 2019, which is a Continuation Application of U.S. patent application Ser. No. 14/413,177, filed in the USPTO on May 12, 2015, now U.S. Pat. No. 10,206,244, issued on Feb. 12, 2019, which is a U.S. National Stage Entry of International Application PCT/KR2013/006052, filed on Jul. 8, 2013, which claims priority to Indian Application No. 2749/CHE/2012, filed on Jul. 6, 2012, the contents of which are incorporated herein by reference.

BACKGROUND OF THE INVENTION

1. Field of the Invention

The present invention relates generally to wireless communication systems, and more particularly, to a method and an apparatus for determining Time Division Duplex (TDD) configurations applicable for radio frames.

2. Description of the Related Art

In wireless communication systems, such as those defined by Third Generation Partnership Project (3GPP) Long Term Evolution (LTE/LTE-A) specification, User Equipments (UEs) and a base station (i.e., eNodeB (eNB)) communicate with each other by sending and receiving data carried in radio signals according to a predefined radio frame format. Typically, the radio frame format contains a sequence of radio frames, each radio frame having a plurality of sub frames. Typically, each radio frame has a duration of 10 milliseconds (ms) and consists of two half frames, each having a duration of 5 ms. Each half frame consists of 5 sub frames having a duration of 1 ms. Each sub frame consists of two slots, each having a duration of 0.5 ms. Each slot consists of a plurality of Orthogonal Frequency Division Multiplexing (OFDM) symbols.

Typically, subframes in a radio frame are configured to perform Uplink (UL) transmission and Downlink (DL) reception in different duplexing methods. For example, a TDD mode is a duplexing method to separate transmitting and receiving radio signals in the time domain such that the same carrier frequency is used for transmission and reception. LTE release 8 specification (TS 36.300) specifies seven different TDD configurations to support different DL/UL traffic ratios for different frequency bands when the TDD mode is employed to perform UL transmission and DL reception. In each TDD configuration, each Subframe (SF) of a radio frame is defined as an Uplink subframe (U), a Downlink subframe (D) or a Special subframe (S). For example, seven TDD configurations are illustrated in Table 1 below:

TABLE 1

| Configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

During an uplink subframe, the UE operates in a transmission mode while the eNB operates in a reception mode. During a downlink subframe, the UE operates in a reception mode while the eNB operates in a transmission mode. During a special subframe, the eNB switches from transmission mode to reception mode and the UE switches from reception mode to transmission mode.

At any given instance, any of above seven TDD configurations may be configured for a serving cell. In LTE Release 12 specification, dynamic TDD reconfiguration on a cell level is envisioned by adapting TDD configuration according to a prevailing traffic load situation in UL and DL for a concerned cell. The dynamic TDD reconfiguration of TDD configuration on a cell level allows optimum utilization of radio resources matching traffic data volume in UL and DL directions.

In Release 11, 3GPP Radio Access Network (RAN) Working Group 1 evaluated performance of dynamic TDD reconfiguration on time scale of 10 ms (fast), 200 ms (medium) and 640 ms (slow) in TR 36.828. The fast adaptation rate of 10 ms reconfigures TDD configuration on a radio frame basis. The slow adaptation rate of 640 ms reconfigures TDD configuration according to minimum System Information (SI) change modification period. For faster reconfiguration, a currently applicable TDD configuration is notified to a UE through physical layer signalling via a new Downlink Control Information (DCI) format. The new DCI format consists of code points to index some or all seven TDD configurations. Typically, a DCI format indicating new TDD configuration is transmitted on a Packet Data Control Channel (PDCCH), where the UE uses a System Information Radio Network Temporary Identifier (SI-RNTI) to decode the DCI format in the common search space of PDCCH.

In a radio frame, subframes SF #0 and SF #5 are fixed as DL subframes, SF #1 is fixed as special subframe, and SF #2 is fixed as UL subframe. For 5 ms switching periodicity configurations, subframe SF #6 is fixed as DL subframe while subframe SF #7 is fixed as UL subframe. Hence, subframes SF #3, SF #4, SF #8 and SF #9 are subframes available for flexible reconfiguration as DL or UL.

According to LTE Release 8 specification (TS 36.300), in order to enable reasonable battery power consumption at the UE, a Discontinuous Reception (DRX) cycle is employed per UE in a connected state. Discontinuous reception allows UE to turn off its radio transceiver during various periods in order to save battery life on the UE. When a DRX cycle is configured for a UE, the UE switches between on duration (also referred to as a period of activity) and off duration (also referred to as a period of inactivity). During the on duration period, the UE monitors one or more subframes of a radio frame. Upon expiry of the on duration period, the UE switches to sleep mode during the off duration period to conserve battery consumption.

When the eNB adapts a dynamic TDD reconfiguration to match a traffic load situation, the TDD UL-DL configuration may need to be reconfigured for each radio frame. As described above, the eNB transmits a new DCI format indicating the current TDD UL-DL configuration to the UE on subframes SF #0 and SF #5 in each radio frame so that the UE knows the TDD UL-DL configuration for each radio frame. However, the UE may be operating in an off duration of the configured DRX cycle when the eNB transmits a new DCI format indicating the current TDD UL-DL configuration applicable for the current radio frame in the subframes SF #0 and SF #5 of the current radio frame. As a consequence, the UE may not be aware of a correct TDD UL-DL configuration applicable for the current radio frame, causing the UE to go out of synchronization with the eNB.

SUMMARY OF THE INVENTION

The present invention has been made to address at least the above problems and/or disadvantages and to provide at least the advantages described below. Accordingly, an aspect of the present invention provides a method and an apparatus for determining applicable TDD configurations for radio frames.

According to one aspect of the present invention, a method is provided for monitoring a PDCCH by a user equipment (UE) in a wireless communication system. The UE receives a system information block (SIB) from a base station. The UE obtains a first TDD UL/DL configuration from the SIB. The UE identifies DL subframes in a radio frame. The DL subframes are indicated by the obtained first TDD UL/DL configuration. The UE monitors the PDCCH transmitted from the base station on a DL subframe included in an on duration period of a DRX cycle among the DL subframes. The UE obtains information about a second TDD UL/DL configuration from the monitored PDCCH. The UE applies the second TDD UL/DL configuration to the radio frame based on the obtained information. The DL subframe corresponds to a predetermined subframe number in the radio frame. The on duration period represents a period corresponding to a predetermined number of subframes from a subframe where the DRX cycle starts, and the on duration period is repeated periodically.

According to another aspect of the present invention, a method is provided for transmitting information for monitoring a PDCCH by a BS in a wireless communication system. The BS transmits, to a UE, a SIB including a first TDD UL/DL configuration. The BS transmits, to the UE, information about a second TDD UL/DL configuration to be applied to a radio frame through the PDCCH on a DL subframe. The DL subframe is one of DL subframes indicated by the first TDD UL/DL configuration in the radio frame. The DL subframe corresponds to a predetermined subframe number in the radio frame. The DL subframe is included in an on duration period of a DRX cycle. The on duration period represents a period corresponding to a predetermined number of subframes from a subframe where the DRX cycle starts, and the on duration period is repeated periodically.

According to another aspect of the present invention, a UE in a wireless communication system is provided. The UE includes a transceiver configured to receive a SIB from a base station. The UE also includes at least one processor configured to: obtain a first TDD UL/DL configuration from the SIB; identify DL subframes in a radio frame, the DL subframes being indicated by the obtained first TDD UL/DL configuration; monitor a PDCCH transmitted from the base station on a DL subframe included in an on duration period of a DRX cycle among the DL subframes; obtain information about a second TDD UL/DL configuration from the monitored PDCCH; and apply the second TDD UL/DL configuration to a radio frame based on the obtained information. The DL subframe corresponds to a predetermined subframe number in the radio frame. The on duration period represents a period corresponding to a predetermined number of subframes from a subframe where the DRX cycle starts, and the on duration period is repeated periodically.

According to another aspect of the present invention, a BS in a wireless communication system is provided. The BS includes a transceiver. The BS also includes at least one processor configured to control the transceiver to: transmit, to a UE, a SIB including a first TDD UL/DL configuration; and transmit, to the UE, information about a second TDD UL/DL configuration to be applied to a radio frame through a PDCCH on a DL subframe, the DL subframe being one of DL subframes indicated by the first TDD UL/DL configuration in the radio frame. The DL subframe corresponds to a predetermined subframe number in the radio frame. The DL subframe is included in an on duration period of a DRX cycle. The on duration period represents a period corresponding to a predetermined number of subframes from a subframe where the DRX cycle starts, and the on duration period is repeated periodically.

BRIEF DESCRIPTION OF DRAWINGS

The above and other aspects, features, and advantages of the present invention will be more apparent from the following detailed description when taken in conjunction with the accompanying drawings, in which:

FIGS. 8A to 8E illustrate diagrams of TDD Configuration Medium Access Control (MAC) Control Element (CE) formats carrying a TDD UL-DL configuration applicable for a current radio frame and/or a subsequent radio frame, according to an embodiment of the present invention.

DETAILED DESCRIPTION OF EMBODIMENTS OF THE PRESENT INVENTION

Figure 1:
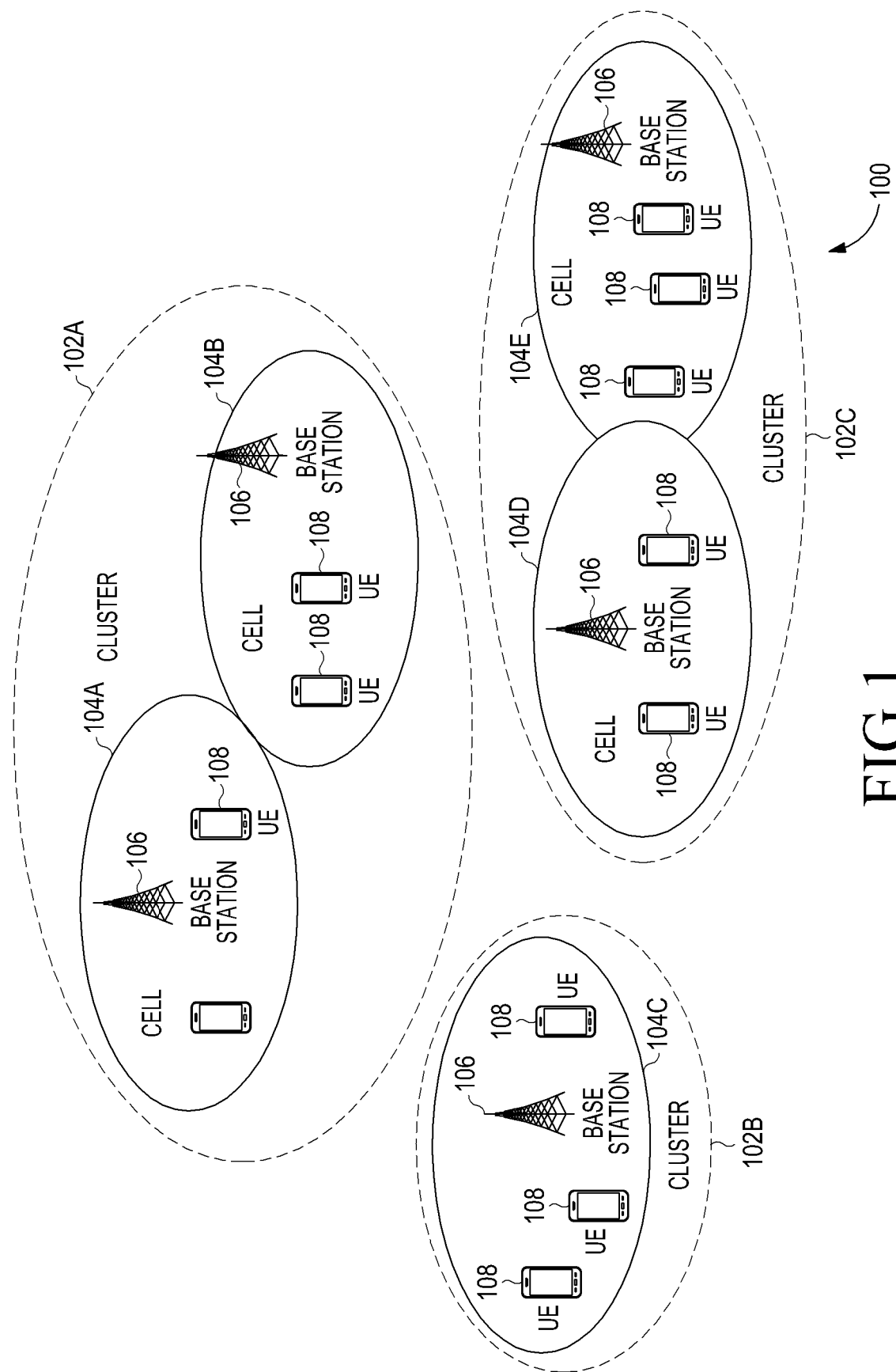
FIG. 1 is a diagram illustrating a wireless network environment, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention provide a method for identifying fixed subframes and flexible subframes during an on duration period of a configured DRX cycle when different TDD UL-DL configurations from predefined TDD UL-DL configurations are dynamically changed on a cell level in a wireless network environment. Further, embodiments of the present invention provide a method for monitoring a PDCCH subframe and handling DRX timers during the on duration period of a configured DRX cycle based on an identified category (e.g., flexible or fixed) of subframes. Further, the present invention provides a method for determining current TDD UL-DL configuration applicable for a radio frame(s) from a set of TDD UL-DL configurations.

FIG. 1 is a diagram illustrating a wireless network environment, according to an embodiment of the present invention. A wireless network environment 100 includes clusters 102A-102C formed of one or more cells. The cluster 102A includes cell 104A and cell 104B. The cluster 102B includes cell 104C. The cluster 102C includes cell 104D and cell 104E. Each of the cells 104A to 104E includes a base station 106 (e.g., eNB) and one or more UEs 108.

Each eNB 106 is configured for transmitting a dynamic reconfiguration indicator indicating to the UE(s) 108 that a dynamic configuration is enabled for a serving cell associated with the respective eNB 106. Also, the eNB 106 is configured for signaling a TDD reconfiguration set bitmap indicating a set of TDD UL-DL configurations applicable during the dynamic reconfiguration to the UE(s) 108. Further, the eNB 106 is configured for signaling a TDD UL-DL configuration applicable for a radio frame(s) from the set of TDD UL-DL configurations when dynamic reconfiguration is enabled for the eNB 106. For example, when the dynamic reconfiguration is enabled, the eNB 106 transmits a new Downlink Control Information (DCI) format indicating TDD UL-DL configuration applicable for a radio through physical layer signaling in subframe #0 (SF #0) and subframe #5 (SF #5) of the radio frame.

The respective UE(s) 108 is configured for monitoring a PDCCH subframe and handling DRX timers upon transitioning from a period of inactivity to a period of activity of a DRX cycle when different TDD UL-DL configurations from a set of TDD UL-DL configuration is dynamically changed on a cell level. When the UE(s) 108 receives the TDD UL-DL configuration applicable for the radio frame during monitoring PDCCH, the UE(s) 108 applies the TDD UL-DL configuration for the radio frame. Also, based on the TDD UL-DL configuration applicable for the radio frame, the UE(s) 108 derives Hybrid Automatic Repeat Request (HARQ) timings for Physical Downlink Shared Channel (PDSCH) and Physical Uplink Shared Channel (PUSCH) retransmissions and ACK/NACK, respectively.

When the UE(s) 108 misses reception of a new DCI format and receives a downlink assignment message or UL grant message during monitoring of PDCCH in a period of activity, the UE(s) 108 performs autonomous denial of ACK/NACK or UL transmission as the UE(s) 108 is not aware of TDD UL-DL configuration applicable for current radio frame. When the eNB 106 determines that the UE(s) 108 has not sent the ACK/NACK or UL transmission in response to the DL assignment message or the UL grant message, the eNB 106 understands that the UE(s) 108 has missed to receive the new DCI format indicating TDD UL-DL configuration applicable for the current radio frame. Accordingly, the eNB 106 signals the TDD UL-DL configuration during a next DL subframe of a current radio frame where the UE(s) 108 is monitoring PDCCH via a new DCI format message, TDD Configuration MAC_CE_message, or Radio Resource Control (RRC) message.

During mobility of the UE 108, a serving cell (e.g., the cell 104A) belonging to a particular cluster (e.g., the cluster 102A) sends a handover command, containing a dynamic reconfiguration indicator indicating dynamic reconfiguration is enabled for a target cell (e.g., the cell 104C) belonging to another cluster (e.g., the cluster 102B), to the UE 108. Additionally, in the handover command, the serving cell 104A may send a cluster indicator indicating TDD UL-DL configuration applicable to the cluster to which the target cell belongs. If the target cell belongs to the same cluster as the serving cell, then the cluster indicator in the handover command is set to value '0' which means TDD UL-DL configuration for the serving cell and the target cell is same.

When the cell 104A belonging to the cluster 102A leaves the cluster 102A and joins another cluster (e.g., cluster 102B), the cell 104A discards the set of TDD UL-DL configuration applicable to the cluster 102A and uses the set of TDD UL-DL configurations applicable to the cluster 104B. If the cell 104A forms a new cluster, the cell 104A determines the set of TDD UL-DL configurations applicable to the new cluster. When the cell 104A leaves one cluster and joins another cluster or forms a new cluster, the cell 104A informs neighboring cells 104B-E through X2 interface. Further, interference avoidance can be accomplished through frequency domain co-ordination of an overlapped UL-DL subframe of adjacent cells through X2 interface. Frequency domain co-ordination is applicable on cluster level or cell level. For example, if the cell 104A of the cluster 102A uses upper frequency partition as UL subframe while the cell 104C of the cluster 102B uses lower frequency partition as DL subframe in the overlapped UL-DL subframe of their respective TDD UL-DL configuration. In an embodiment of the present invention, adjacent cells having a dynamic reconfiguration of TDD UL-DL configuration can co-ordinate the overlapped UL-DL subframe of their respective TDD UL-DL configuration in a frequency domain applying subframe partitioning such that one cell 104A uses one partition as DL subframe, while the other cell 104B uses the other partition as UL subframe avoiding the overlap.

LTE specification TS 36.133 specifies the following rule: "For E-UTRAN TDD, the UE do not transmit in the uplink subframe occurring immediately after the measurement gap if the subframe occurring immediately before the measurement gap is a downlink subframe". In the context of dynamic reconfiguration the specified rule needs to be extended for the case of flexible subframe. According to an embodiment of the present invention, the UE 108 defers UL transmission in a flexible subframe occurring immediately after a measurement gap if a subframe occurring immediately before the measurement gap is a downlink subframe or a special subframe. The UE 108 also defers UL transmission in a flexible subframe occurring immediately after a measurement gap if a subframe occurring immediately before the measurement gap is a flexible subframe.

Figure 2:
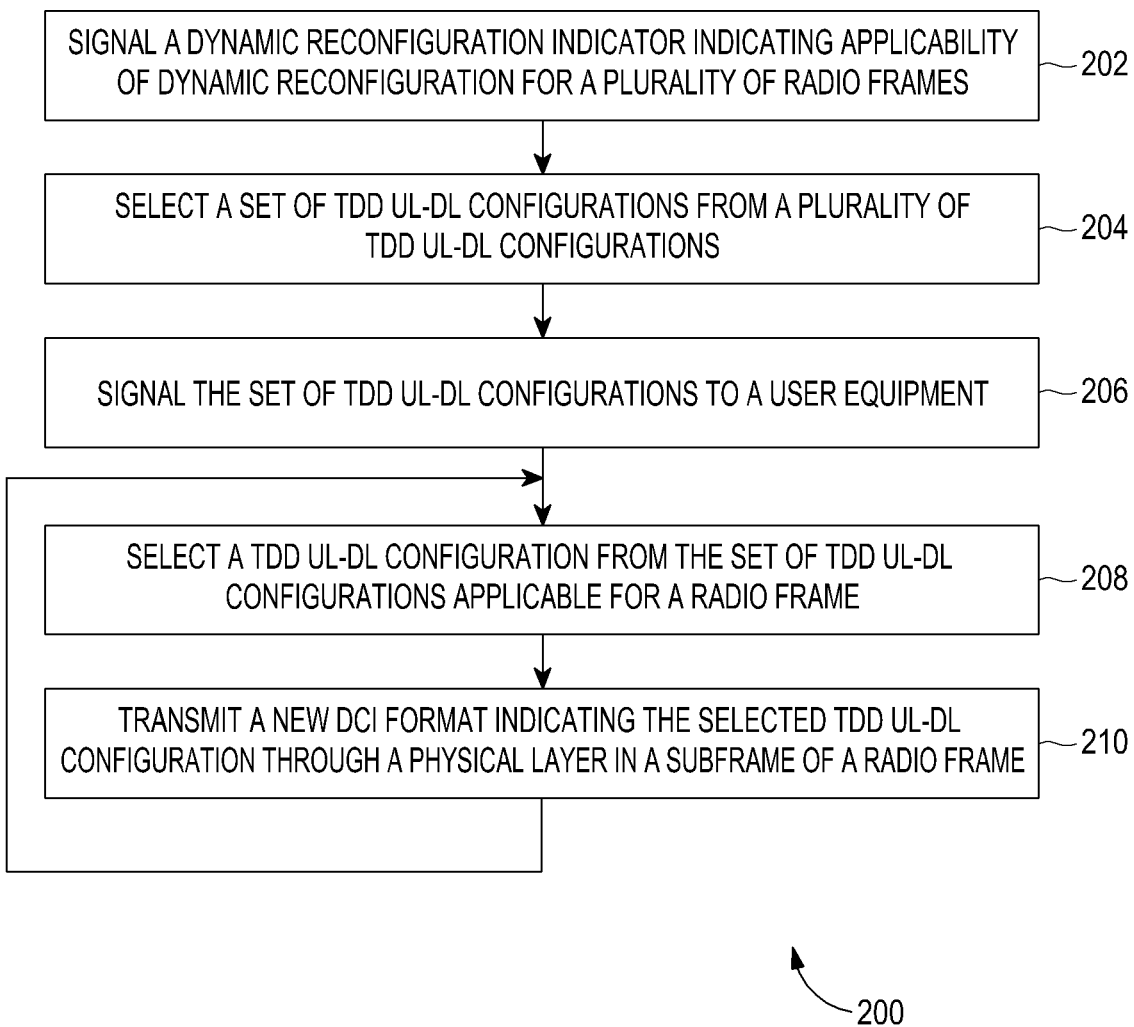
FIG. 2 is a flowchart illustrating a method of indicating a TDD UL-DL configuration applicable for a radio frame, according to an embodiment of the present invention.

FIG. 2 is a flowchart 200 illustrating a method of indicating a TDD UL-DL configuration applicable for a radio frame, according to an embodiment of the present invention. In step 202, a dynamic reconfiguration indicator indicating applicability of dynamic reconfiguration for a plurality of radio frames is signaled from the eNB 106. For example, if the dynamic reconfiguration indicator is set to '1', it implies that the dynamic reconfiguration is enabled for the serving cell. If the dynamic reconfiguration indicator is set to '0', then it implies the dynamic reconfiguration is not enabled for the serving cell. In an embodiment of the present invention, a dynamic reconfiguration indicator is signaled through a cell-specific system information broadcast message or through a UE-specific dedicated RRC signaling message. One skilled in the art would understand that the dynamic configuration indicator is signaled in any other message. In an embodiment of the present invention, validity information associated with the dynamic reconfiguration indicator, indicating a duration for which dynamic reconfiguration of TDD UL-DL configuration is enabled, is also provided to the UE 108 along with the dynamic reconfiguration indicator.

In step 204, a set of TDD UL-DL configurations is selected from a plurality of TDD UL-DL configurations. For example, a set of TDD UL-DL configurations (e.g., configurations 0, 1 and 2) are selected from seven TDD UL-DL configurations as depicted in Table 2 below.

TABLE 2

| Configuration | TDD Reconfiguration Set bitmap | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 1 | D | S | U | U | U | D | S | U | U | U |
| 1 | 1 | D | S | U | U | D | D | S | U | U | D |
| 2 | 1 | D | S | U | D | D | D | S | U | D | D |
| 3 | 0 | D | S | U | U | U | D | D | D | D | D |
| 4 | 0 | D | S | U | U | D | D | D | D | D | D |
| 5 | 0 | D | S | U | D | D | D | D | D | D | D |
| 6 | 0 | D | S | U | U | U | D | S | U | U | D |

In step 206, the set of TDD UL-DL configurations used for dynamic reconfiguration is signaled to the UE 108. In an embodiment of the present invention, a "TDD reconfiguration set bitmap" indicating the set of TDD UL-DL configurations used for dynamic reconfiguration is signaled to the UE 108. The bitmap is indexed to a plurality of pre-defined TDD UL-DL configurations. The bitmap includes seven bits, each bit indexed to corresponding pre-defined TDD UL-DL configuration in Table 2. The "TDD reconfiguration set bitmap" is indexed to the plurality of pre-defined TDD UL-DL configurations such that the left most bit corresponds to the TDD UL-DL configurations 0, while the right most bit corresponds to the TDD UL-DL configurations 6. For example, when TDD UL-DL configurations 0, 1, and 2 are selected for dynamic reconfiguration, the bitmap [1110000] is signaled to the UE 108, which indicates that the set of TDD UL-DL configuration constitutes TDD UL-DL configurations 0, 1, and 2. The bit '1' in the "TDD reconfiguration set bitmap" indicates that the corresponding indexed TDD UL-DL configuration is selected for dynamic reconfiguration, while the bit '0' indicates that the corresponding indexed TDD UL-DL configuration is not selected. In an embodiment of the present invention, the "TDD configuration set bitmap" is signaled in a cell-specific System Information Broadcast (SIB) message in any of SIBs or a UE specific dedicated RRC signaling message.

When the dynamic reconfiguration is enabled and the eNB 106 signals the dynamic reconfiguration indicator set to '1' to UE 108, then the signaling of a set of TDD UL-DL configurations in step 204 is optional. In such case, the UE 108 assumes all the seven pre-defined TDD UL-DL configurations indicated in Table 2 are used for dynamic reconfiguration. In an embodiment of the present invention, the eNB 106 signals the "TDD reconfiguration set bitmap" to the UE 108 either through cell-specific system information broadcast or through UE-specific dedicated RRC signaling. Alternatively, when the dynamic reconfiguration is disabled and the eNB 106 signals the dynamic reconfiguration indicator set to '0' to the UE 108, then the UE 108 assumes that the dynamic reconfiguration is not enabled for the serving cell and starts using the TDD UL-DL configuration indicated in a SIB-1 received from the eNB 106. In an embodiment of the present invention, the serving cell signals a dynamic reconfiguration indicator either through cell-specific system information broadcast or through UE-specific dedicated RRC signaling.

The eNB 106 need not signal the dynamic reconfiguration indicator to the UE in step 202. Instead the eNB 106 may signal the "TDD reconfiguration set bitmap" indicating the set of TDD UL-DL configurations applicable for dynamic reconfiguration in the serving cell. Accordingly, the UE 108 understands that the dynamic reconfiguration is enabled for the serving cell. However, when the dynamic reconfiguration indicator is not signaled and the TDD reconfiguration set bitmap signaled to the UE indicates single TDD UL-DL configuration, then the UE 108 assumes that the dynamic TDD configuration is not enabled for the serving cell. In an embodiment of the present invention, validity information associated with the "TDD reconfiguration set bitmap" indicating duration for which a set of TDD UL-DL configurations is valid is also provided to the UE 108 along with the "TDD reconfiguration set bitmap".

In step 208, a TDD UL-DL configuration for a current radio frame is selected by the eNB 106 from the indicated set of TDD UL-DL configurations. In step 210, a new DCI format indicating the selected TDD UL-DL configuration is transmitted through a physical layer signaling in a subframe (e.g., subframe #0 and/or subframe #5) of the current radio frame. In an embodiment of the present invention, the new DCI format is 3 bit information addressing the seven pre-defined TDD UL-DL configurations indicated in Table 2. For example, if the new DCI format indicates '011', it implies the TDD UL-DL configuration 3 is applicable for the current radio frame. The DCI format 111 is for future use if a new TDD configuration is defined apart from the seven configurations indicated in Table 2. Alternatively, the new DCI format indicates the TDD UL-DL configuration for subsequent radio frame(s). Accordingly, the UE 108 applies the TDD UL-DL configuration for the current radio frame and optionally the subsequent radio frame(s) upon receiving the DCI format. Steps 208 and 210 may or may not be repeated for every radio frame. In an embodiment of the present invention, validity information associated with the "new DCI format" indicating duration for which the indicated TDD UL-DL configuration is valid is also provided to the user equipment 108 along with the "new DCI format".

Figure 3A:
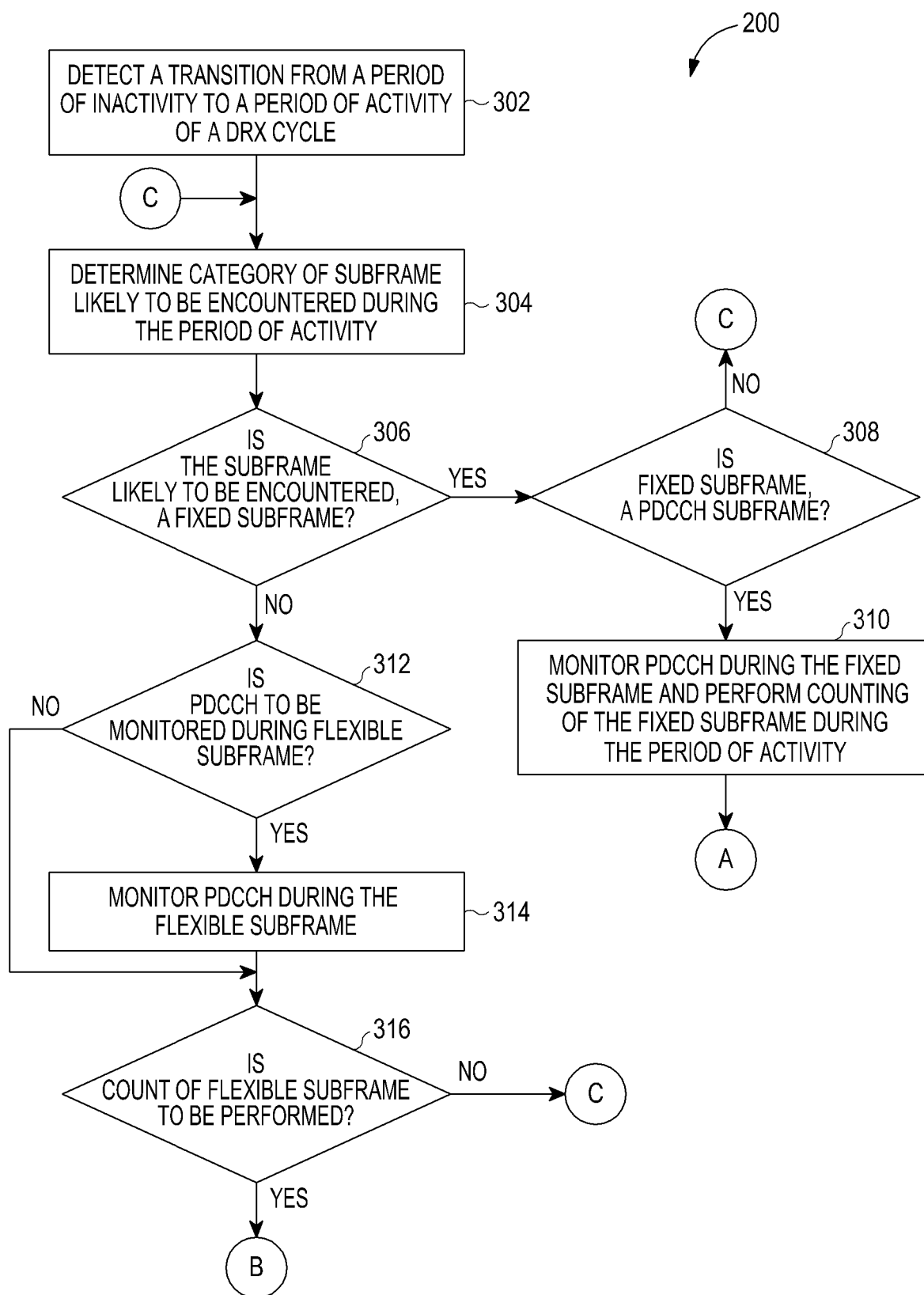
FIGS. 3A and 3B are flowcharts illustrating a method of determining a TDD UL-DL configuration for a current radio frame upon waking up from a period of inactivity of a configured DRX cycle, according to an embodiment of the present invention.
Figure 3B:
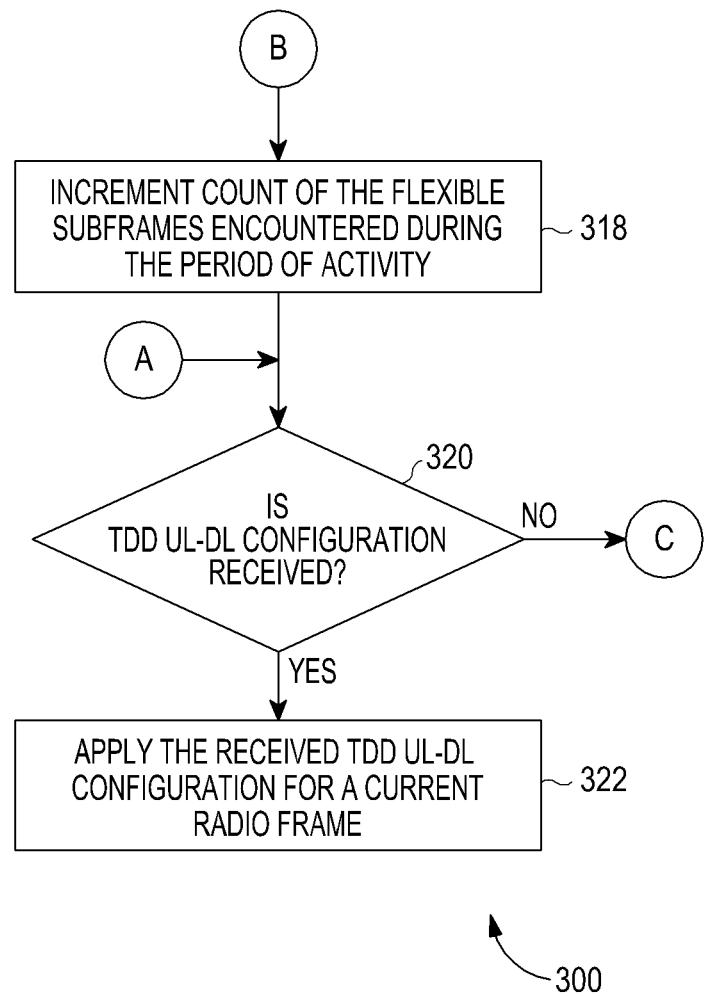

FIGS. 3A and 3B are flowcharts 300 illustrating a method of determining a TDD UL-DL configuration for a current radio frame upon waking up from a period of inactivity of a configured DRX cycle, according to an embodiment of the present invention. In step 302, a transition from period of inactivity (also referred to as an off duration period) to a period of activity (also referred to as an on duration period) of the configured DRX cycle is detected. In step 304, a category of a subframe likely to be encountered upon waking up from the period of inactivity is determined based on a set of TDD UL-DL configurations used for dynamic reconfiguration indicated by the eNB 106. In an embodiment of the present invention, a category of subframes is determined by the UE 108 by performing an intersection of DL subframes, special subframes, and UL subframes across the set of TDD UL-DL configurations upon receiving the "TDD reconfiguration set bitmap" from the eNB 106. It is appreciated that the intersection operation is equivalent to a logical AND operation. For example, a subframe category is determined as a fixed subframe if a subframe type (e.g., DL subframe, UL subframe, special subframe) after an intersection operation matches with the same subframe type across the set of TDD UL-DL configurations in the corresponding subframe location.

On the other hand, a subframe category is determined as a flexible subframe if a subframe type (e.g., DL subframe, UL subframe, special subframe) does not match the same subframe type across the set of TDD UL-DL configurations in the corresponding subframe location. In this embodiment of the present invention, a category of a subframe likely to be encountered upon waking up from the period of inactivity is determined based on a subframe number in which the UE 108 woke up from the period of inactivity of the configured DRX cycle. For example, TDD UL-DL configurations 0, 1, 2 and 6 may be selected for dynamic reconfiguration among TDD configurations 0 to 7, as shown in Table 3.

TABLE 3

| Configuration | TDD Reconfiguration Set bitmap | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 1 | D | S | U | U | U | D | S | U | U | U |
| 1 | 1 | D | S | U | U | D | D | S | U | U | D |
| 2 | 1 | D | S | U | D | D | D | S | U | D | D |
| 3 | 0 | D | S | U | U | U | D | D | D | D | D |
| 4 | 0 | D | S | U | U | D | D | D | D | D | D |
| 5 | 0 | D | S | U | D | D | D | D | D | D | D |
| 6 | 1 | D | S | U | U | U | D | S | U | U | D |
| Subframe Category | | FX | FX | FX | FL | FL | FX | FX | FX | FL | FL |
| Subframe Type | | D | S | U | AM | AM | D | S | U | AM | AM |
| PDCCH subframe according to intersection operation rule | | P | P | | | | P | P | | | |

The UE 108 determines a subframe category for each subframe location (subframes #0 to #9) across the TDD UL-DL configurations 0, 1, 2, and 6 by performing an intersection operation for each subframe type (e.g., DL subframe, UL subframe and special subframe) across the set of TDD UL-DL configurations 0, 1, 2, and 6 for corresponding subframe location. For example, the user equipment 108 performs an intersection of DL subframe for subframe #0 (SF #0) across the TDD UL-DL configurations 0, 1, 2, and 6, and determines the subframe category associated with the (SF #0) as a fixed subframe indicated as 'FX' in Table 3. Similarly, the UE 108 performs intersection of each subframe type for (SF #3) across the TDD UL-DL configurations 0, 1, 2, and 6 and determines the subframe category associated with the SF #3 as a flexible subframe indicated as 'FL' in Table 3. In this manner, the UE 108 can determine a subframe category for each of subframes #0 to #9 of a radio frame. Accordingly, upon waking up from the period of inactivity, the UE 108 can determine a category of a subframe in a current radio frame that is likely to be encountered using a predetermined category of subframes in the current radio frame. For example, if the UE 108 wakes up at subframe #0 (SF #0) of a radio frame, the UE 108 determines that the subframe #0 (SF #0) is a fixed subframe. Alternatively, if the UE 108 wakes up at subframe #3 (SF #3) of the radio frame, the UE 108 determines that the subframe #3 is a flexible subframe. From the UE 108 perspective, when the UE 108 wakes from a period of inactivity of the configured DRX cycle and encounters a flexible subframe, then the encountered subframe is ambiguous to the UE 108 (indicated as 'AM' in Table 3) because the TDD UL-DL configuration applicable to the current radio frame is not known to the UE 108. From the eNB 106 perspective, the flexible subframe means that the subframe type can be configured either as D or U. From the UE 108 perspective, the subframe type is not known to the UE 108 (i.e., ambiguous as whether the subframe type is downlink or uplink) when the UE wakes up from the period of inactivity of the configured DRX cycle and encounters a flexible subframe category.

In step 306, it is determined whether the subframe encountered upon waking up from the inactive period is a fixed subframe. If it is determined that the subframe is the fixed subframe, it is determined whether the fixed subframe is a PDCCH subframe, in step 308. In an embodiment of the present invention, the fixed subframe is identified as a PDCCH subframe if the subframe type corresponding to the fixed subframe is one of a downlink subframe or a special subframe indicated as 'P' in Table 3. In step 310, PDCCH is monitored during the fixed subframe, and step 320 is performed. Also, in step 310, counting of the fixed subframe towards at least one of the DRX timers (e.g., on duration timer, DRX inactivity timer, and/or DRX retransmission timer) is performed during the period of activity of the configured DRX cycle.

If, in step 306, it is determined that the subframe is a flexible subframe, it is determined whether PDCCH is to be monitored during the flexible subframe, in step 312. If it is determined that the PDCCH is to be monitored during the flexible subframe, the PDCCH is monitored during the flexible subframe, in step 314. If it is determined that PDCCH is not to be monitored during the flexible subframe, then step 316 is performed. In step 316, it is determined whether a count of the flexible subframe towards the DRX timers is to be performed during a period of activity of the DRX cycle. If the count of the flexible subframe towards the DRX timers is to be performed, the count of flexible subframes encountered during the period of activity of the DRX cycle is incremented towards the respective DRX timers, in step 318. Otherwise, the process is routed to step 304 in which it is determined whether subsequent subframe during the period of activity of the DRX cycle is a fixed subframe or a flexible subframe.

According to an embodiment of the present invention, the UE 108 determines whether PDCCH is to be monitored on the flexible subframe and count of the flexible subframe is to be performed based on a set of rules. In an embodiment of the present invention, upon receiving a set of TDD UL-DL configurations from the eNB 106, a union of subframe types corresponding to each subframe is performed across the set of TDD UL-DL configurations according to a union operation rule. It is appreciated that the union operation is equivalent to a logical OR operation. One or more flexible subframes among the flexible subframes are identified as a PDCCH subframe if at least one subframe type in the corresponding subframe location across the indicated set of TDD UL-DL configurations is one of a downlink subframe or a special subframe as shown in Table 4.

TABLE 4

| Configuration | TDD Reconfiguration Set bitmap | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 1 | D | S | U | U | U | D | S | U | U | U |
| 1 | 1 | D | S | U | U | D | D | S | U | U | D |
| 2 | 1 | D | S | U | D | D | D | S | U | D | D |
| 3 | 0 | D | S | U | U | U | D | D | D | D | D |
| 4 | 0 | D | S | U | U | D | D | D | D | D | D |
| 5 | 0 | D | S | U | D | D | D | D | D | D | D |
| 6 | 1 | D | S | U | U | U | D | S | U | U | D |
| Subframe Category | | FX | FX | FX | FL | FL | FX | FX | FX | FL | FL |
| Subframe Type | | D | S | U | AM | AM | D | S | U | AM | AM |
| PDCCH subframe according to union operation rule | | P | P | | P | P | P | P | | P | P |

In Table 4, subframe #3 (SF #3) is a flexible subframe, which can considered for PDCCH monitoring according to the union operation rule. SF #3 in the TDD UL-DL configuration 2 is 'D'. Therefore, according to a union operation rule, flexible subframe SF #3 can be considered as PDCCH subframe as indicated as 'P' in Table 4. Similarly, subframes #4, #8, and #9 are flexible subframes and can be considered as PDCCH subframe according to the union operation rule.

During the activity period of the DRX cycle, it is determined whether the flexible subframe belongs to the one or more flexible subframes, which are identified as PDCCH subframes based on a subframe number associated with the flexible subframe. If one or more flexible subframes are considered as PDCCH subframe according to the union operation rule, then PDCCH is monitored during the flexible subframe. Also, the flexible subframe identified as PDCCH subframe is counted towards the respective DRX timers during the activity period of the DRX cycle.

In another embodiment of the present invention, PDCCH is not monitored during the flexible subframe as all the subframe types corresponding to the flexible subframe across the set of TDD UL-DL configurations do not contain DL subframe or special subframe. In Table 3, subframe #3 (SF #3) is a flexible subframe, which is not considered for PDCCH monitoring according to the intersection operation rule. However, the flexible subframe is counted during the period of activity of the configured DRX cycle according to the union operation rule.

In yet another embodiment of the present invention, PDCCH is not monitored during the flexible subframe and the flexible subframe is not counted during the activity period of the DRX cycle.

In a further embodiment of the present invention, a primary TDD UL-DL configuration from the indicated set of TDD UL-DL configurations is determined. Further, a subframe type of a primary TDD UL-DL configuration corresponding to the flexible subframe is used to determine whether the flexible subframe can be considered a PDCCH subframe. It is determined whether the subframe type corresponding to the flexible subframe in the primary TDD UL-DL configuration is a DL subframe or a special subframe. If the subframe type is downlink subframe or a special subframe, then the corresponding flexible subframe is considered as PDCCH subframe. For example, if the flexible subframe corresponds to subframe #4 (SF #4) and subframe type corresponding to the subframe #4 of the primary TDD UL-DL configuration is downlink subframe or special subframe, then the flexible subframe (SF #4) is identified as PDCCH subframe as shown in Table 5.

TABLE 5

| Configuration | TDD Reconfiguration Set bitmap | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 1 | D | S | U | U | U | D | S | U | U | U |
| 1 | 1 | D | S | U | U | D | D | S | U | U | D |
| 2 | 1 | D | S | U | D | D | D | S | U | D | D |
| 3 | 0 | D | S | U | U | U | D | S | U | D | D |
| 4 | 0 | D | S | U | U | D | D | D | D | D | D |
| 5 | 0 | D | S | U | D | D | D | D | D | D | D |
| 6 | 0 | D | S | U | U | U | D | S | U | U | D |
| Subframe Category | | FX | FX | FX | FL | FL | FX | FX | FX | FL | FL |
| Subframe Type | | D | S | U | AM | AM | D | S | U | AM | AM |
| PDCCH subframe according to primary TDD configuration (i.e Configuration 1) | | P | P | | | P | P | P | | | P |

Following the primary TDD configuration rule, subframes #3 and #8 are flexible subframes but are not considered PDCCH subframes, while SF #4 and SF #9 are considered as PDCCH subframes.

If the corresponding subframe type in the primary TDD configuration is DL subframe or special subframe, PDCCH is monitored during the flexible subframe according to following the primary TDD configuration rule. Further, the flexible subframe is counted towards the DRX timers during the activity period of the DRX cycle. This is applicable when one TDD UL-DL configuration in the set of TDD UL-DL configurations is signaled as a primary TDD UL-DL configuration via a SIB1. For example, the primary TDD UL-DL configuration is a TDD UL-DL configuration generally used by legacy UE 108s for HARQ timing and DRX operation. It can be noted that, depending on traffic conditions, the eNB 106 may change primary TDD UL-DL configuration and notify the change in the primary TDD UL-DL configuration to the user equipment 108 via a system information change notification procedure which has a minimum modification period of 640 ms. For example, current primary TDD UL-DL configuration is configuration 1 when a set of TDD UL-DL configuration 0, 1 and 2 are used for dynamic reconfiguration as shown in Table 5, Suppose a TDD UL-DL configuration 2 is set as a primary TDD UL-DL configuration. In such case, the eNB 106 indicates the change in primary TDD UL-DL configuration from the TDD UL-DL configuration 1 to the TDD UL-DL configuration 2 as primary TDD UL-DL configuration via SIB-1.

In another embodiment of the present invention, a subframe type of the primary TDD UL-DL configuration corresponding to the flexible subframe is used to determine whether the flexible subframe can be considered as PDCCH subframe. It is determined whether the subframe type corresponding to the flexible subframe in the primary TDD UL-DL configuration is a DL subframe. If the subframe type is a downlink subframe, then the corresponding flexible subframe is considered as PDCCH subframe and PDCCH is monitored during the flexible subframe. Further, the corresponding flexible subframe is counted towards the DRX timers during the period of activity of the DRX cycle. This is applicable when one TDD UL-DL configuration in the set of TDD UL-DL configurations is signaled as a primary TDD UL-DL configuration via a SIB1.

In still another embodiment of the present invention, information on PDCCH subframes are explicitly indicated to the UE 108 by the eNB 106 via system information broadcast message or a dedicated signaling message. It is determined whether the flexible subframe is a PDCCH subframe based on the PDCCH subframes indicated by the eNB 106. If the flexible frame is a PDCCH frame, PDCCH is monitored during the flexible subframe. Further, the flexible subframe is counted towards the DRX timers during the activity period of the DRX cycle.

In another embodiment of the present invention, a PDCCH subframe is pre-configured in the UE 108 when the dynamic reconfiguration is enabled for the serving cell. If the flexible frame corresponds to a PDCCH frame, PDCCH is monitored during the flexible subframe. Further, the flexible subframe is counted towards the DRX timers during the activity period of the DRX cycle.

Referring back to FIG. 3B, in step 320, it is determined whether a TDD UL-DL configuration applicable for a current radio frame is received during monitoring of the PDCCH. For example, the UE 108, while monitoring PDCCH, may receive a signaling message indicating at least one of TDD UL-DL configuration applicable for one or more radio frames, validity information associated with the TDD UL-DL configuration, and/or a System Frame Number (SFN) information. For example, the UE 108 may receive the TDD UL-DL configuration if the subframe is subframe #0 or subframe #5 of the current radio frame. The TDD UL-DL configuration is selected from the indicated set of TDD UL-DL configurations and is signaled in the PDCCH subframe. The validity information indicates a duration for which the indicated TDD UL-DL configuration is valid. The SFN information indicates an SFN at which the indicated TDD UL-DL configuration is to be applied. The signaling message is one of a new DCI format message, a TDD Configuration MAC CE message, and an RRC message. It can be noted that, step 320 is performed when the PDCCH is monitored irrespective of whether the count of the PDCCH subframe is performed.

If the TDD UL-DL configuration is received, the TDD UL-DL configuration is applied during remaining subframes of the current radio frame that are likely to be encountered during the period of activity of the DRX cycle, in step 322. If the TDD UL-DL configuration applicable for the current radio frame is not received, the process is routed to step 304.

Figure 4:
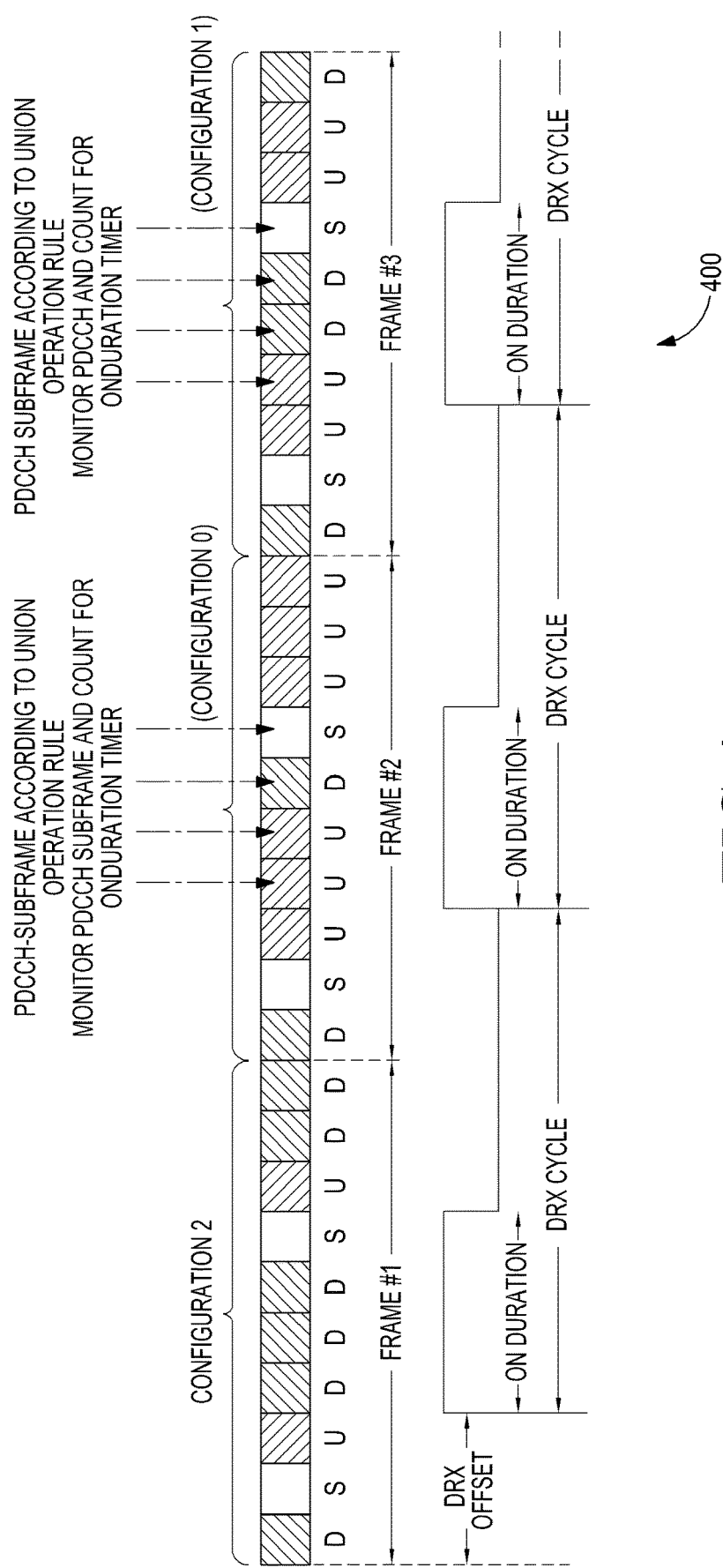
FIG. 4 is a diagram illustrating a process of monitoring PDCCH and counting DRX timers, according to an embodiment of the present invention.

FIG. 4 is a diagram illustrating a process of monitoring PDCCH and counting DRX timers, according to an embodiment of the present invention. Consider that the eNB 106 has configured TDD UL-DL configurations 0, 1 and 2 for dynamic reconfiguration from the TDD UL-DL configurations 0-6 for the serving cell. Also, consider that the UE 108 has received a dynamic reconfiguration indicator indicating that dynamic TDD UL-DL configuration is enabled for the serving cell and has indicated applicability of the TDD UL-DL configurations 0, 1, and 2 in a TDD reconfiguration set bitmap.

Upon receiving the TDD UL-DL configurations 0, 1, and 2, the UE 108 determines a category of subframes by performing an intersection operation on DL subframes, special subframes, and UL subframes across the set of TDD UL-DL configurations 0, 1 and 2. Also, the UE 108 identifies PDCCH frames across the set of TDD UL-DL configurations 0, 1 and 2 by performing union operation on DL subframe and special subframe across the set of TDD UL-DL configurations.

TDD UL-DL configurations 2, 0, and 1 are configured for radio frames #1, #2 and #3 respectively, as depicted in a schematic representation 400 of FIG. 4. For purpose of illustration, consider that DRX start offset is equal to 3 ms, ON duration timer is equal to 4 ms, and DRX cycle is of 10 ms length, and DRX inactivity timer is equal to 0 ms.

According to the configured DRX cycle, the UE 108 wakes up from the period of inactivity in the subframe #3 of the radio frame #2 and enters period of inactivity at the end of subframe #6 on expiry of the on duration timer. The UE 108 is not aware of the TDD UL-DL configuration applicable for the radio frame #2 when it wakes up in SF #3 of radio frame #2. From the UE 108 perspective, SF #3 is an ambiguous subframe as the user equipment 108 determines that the subframe #3 is a flexible frame according to the intersection operation. Further, the UE 108 determines that the subframe #3 corresponds to one of the identified PDCCH subframes according to the rule governed by union operation for identifying PDCCH subframe as shown in Table 6 below.

TABLE 6

| Configuration | TDD Reconfiguration Set bitmap | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 1 | D | S | U | U | U | D | S | U | U | U |
| 1 | 1 | D | S | U | U | D | D | S | U | U | D |
| 2 | 1 | D | S | U | D | D | D | S | U | D | D |
| 3 | 0 | D | S | U | U | U | D | D | D | D | D |
| 4 | 0 | D | S | U | U | D | D | D | D | D | D |
| 5 | 0 | D | S | U | D | D | D | D | D | D | D |
| 6 | 0 | D | S | U | U | U | D | S | U | U | D |
| Subframe Category | | FX | FX | FX | FL | FL | FX | FX | FX | FL | FL |
| Subframe Type | | D | S | U | AM | AM | D | S | U | AM | AM |
| PDCCH subframe according to union operation rule | | P | P | | P | P | P | P | | P | P |

Accordingly, the UE 108 monitors PDCCH during the subframe #3 and counts the flexible subframe towards the on duration timer. Consider that, during PDCCH monitoring, the UE 108 does not receive a TDD UL-DL configuration applicable for the radio frame #2, Further, the UE 108 determines a category of the subframe #4. The UE 108 determines that the subframe #4 is also a flexible subframe and monitors PDCCH during the subframe #4 and counts the flexible subframe towards on duration timer according to the union operation rule. However, the UE 108 does not receive TDD UL-DL configuration applicable for the radio frame #2 in SF #4 since from the eNB perspective SF #4 is an uplink subframe.

Since the UE 108 has not received a TDD UL-DL configuration in the subframe #3 and subframe #4, the UE 108 further determines the category of subframe #5 as a fixed subframe. As subframe type associated with the subframe #5 is a downlink subframe, the UE 108 monitors PDCCH during the subframe #5. During the PDCCH monitoring, the UE 108 receives a new DCI format that signals TDD UL-DL configuration for the radio frame #2, or a DL assignment message on PDSCH and/or a TDD Configuration MAC CE indicating TDD UL-DL configuration applicable for the radio frame #2. The UE 108 applies the TDD UL-DL configuration (i.e., the configuration 0) received in the subframe #5. Furthermore, the UE 108 monitors PDCCH and counts DRX timers based on the applied TDD UL-DL configuration for the remaining activity period of the DRX cycle. Since the DRX inactivity timer is equal to 0 ms, the ON duration timer expires after subframe #6 and the UE 108 enters a period of inactivity after the subframe #6. If the UE 108 has received a DL assignment message in the subframe #5 or subframe #6 of the radio frame #2, the UE 108 performs HARQ ACK/NACK according to a timing for the TDD UL-DL configuration 0. In this manner, the UE 108 determines TDD UL-DL configuration applicable during the radio frame #2.

The above process is repeated when the UE 108 wakes up from a period of inactivity of the DRX cycle a next time. For example, the UE 108 wakes up in the subframe #3 of the radio frame #3, which is a flexible subframe, as shown in Table 6. The UE 108 monitors the PDCCH during the subframe #3, according to a union operation rule, but does not receive a TDD UL-DL configuration applicable for the radio frame #3. Then, the UE 108 increments the on duration timer and proceeds with the subframe #4 and determines that the subframe #4 is a flexible subframe. Further, the UE 108 determines that the subframe #4 is a PDCCH subframe based on the union operation performed on the set of TDD UL-DL configuration 0, 1 and 2. Accordingly, the UE 108 monitors the PDCCH during the subframe #4 and counts the DRX timer. Consider that the UE 108 receives a new DCI format or a DL assignment message on PDSCH along with TDD Configuration MAC GE containing TDD UL-DL configuration applicable for the radio frame #3 or only the TDD Configuration MAC CE containing TDD UL-DL configuration. Based on the TDD UL-DL configuration received from the eNB 106, the UE 108 monitors PDCCH during the remaining period of activity of the configured DRX cycle.

Figure 5:
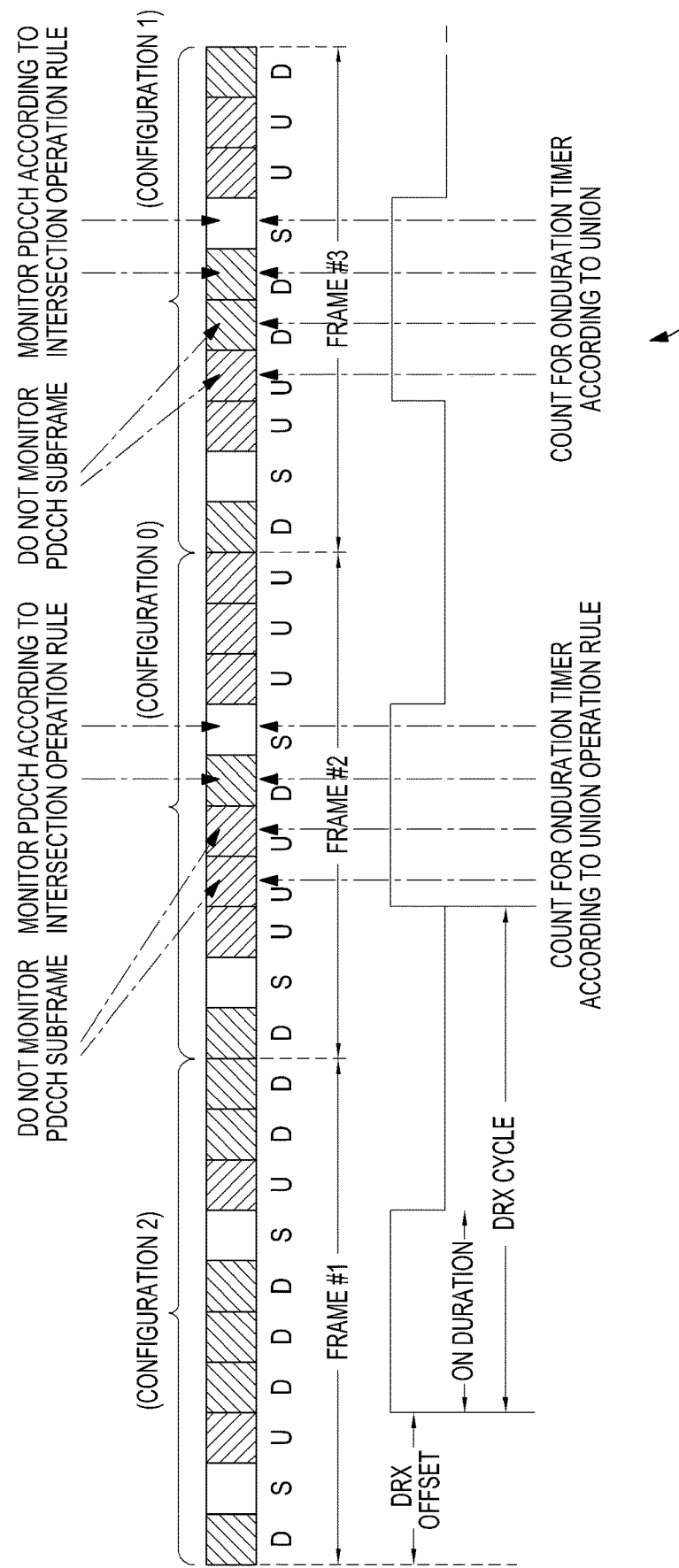
FIG. 5 is a diagram illustrating a process of monitoring PDCCH and counting DRX timers, according to another embodiment of the present invention.

FIG. 5 is a diagram illustrating a process of monitoring PDCCH and counting DRX timers, according to another embodiment of the present invention. According to a schematic representation illustrated in FIG. 5, the UE 108 does not monitor PDCCH when a flexible frame is encountered according to the rule governed by an intersection operation for identifying a PDCCH subframe, as shown in Table 7, but counts the flexible subframe towards the on duration timer during the period of activity of the DRX cycle.

According to the configured DRX cycle, the UE 108 wakes up from the period of inactivity in the subframe #3 of the radio frame #2 and enters a period of inactivity at the end of subframe #6, as the on duration timer is 4 ms and inactivity timer is 0 ms. Since the UE 108 is not aware of the TDD UL-DL configuration applicable for the radio frame #2, the UE 108 may not know which subframes are to be monitored during period of activity.

Upon waking up from the period of inactivity, the UE 108 determines that the subframe #3 is a flexible frame. Further, the UE 108 determines that the subframe #3 does not correspond to one of the identified PDCCH subframes, according to the intersection operation. Accordingly, the UE 108 does not monitor PDCCH during the subframe #3. However, the UE 108 determines that the flexible subframe needs to be counted towards the on duration timer during the period of activity. Hence, the UE 108 counts the flexible subframe towards the period of activity as shown in FIG. 5, and the UE 108 moves to subframe #4 (SF #4) and determines that subframe #4 (SF #4) is also a flexible subframe. The user equipment 108 does not monitor the PDCCH in the SF #4 according to the intersection operation rule. However, the UE 108 counts the flexible frame towards the on duration timer during the period of activity of the DRX cycle.

Since the UE 108 has not monitored PDCCH in the subframe #3 and subframe #4, there is no possibility of knowing the TDD UL-DL configuration applicable for the radio frame #2. Therefore, the UE 108 determines a subframe category for the subframe #5. The UE 108 determines that the subframe #5 is a fixed subframe. Also, the UE 108 determines that PDCCH is to be monitored according to the intersection operation rule as the fixed subframe #5 is a PDCCH subframe. In an embodiment of the present invention, the UE 108 refers to Table 7 below to determine whether PDCCH is to be monitored during the fixed subframe #5. Accordingly, the UE 108 monitors the PDCCH during the fixed subframe #5 while the on duration timer is incremented.

TABLE 7

| Configuration | TDD Reconfiguration Set bitmap | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 1 | D | S | U | U | U | D | S | U | U | U |
| 1 | 1 | D | S | U | U | D | D | S | U | U | D |
| 2 | 1 | D | S | U | D | D | D | S | U | D | D |
| 3 | 0 | D | S | U | U | U | D | D | D | D | D |
| 4 | 0 | D | S | U | U | D | D | D | D | D | D |
| 5 | 0 | D | S | U | D | D | D | D | D | D | D |
| 6 | 0 | D | S | U | U | U | D | S | U | U | D |
| Subframe Category | | FX | FX | FX | FL | FL | FX | FX | FX | FL | FL |
| Subframe Type | | D | S | U | AM | AM | D | S | U | AM | AM |
| PDCCH subframe according to intersection operation rule | | P | P | | | | P | P | | | |

During PDCCH monitoring, the UE 108 receives a new DCI format that signals TDD UL-DL configuration for the radio frame #2, or a DL assignment message on PDSCH and/or a TDD Configuration MAC CE message indicating TDD UL-DL configuration applicable for the radio frame #2. The UE 108 applies the TDD UL-DL configuration (i.e., the configuration 0) received in the subframe #5. Furthermore, the user equipment 108 monitors PDCCH and performs counting of DRX timers based on the applied TDD UL-DL configuration for the remaining activity period of the DRX cycle. Since the DRX activity timer is equal to 0 ms, the ON duration timer expires after subframe #6 and the UE 108 enters a period of inactivity after the subframe #6. If the UE 108 has received a DL assignment message in the subframe #5 or subframe #6 of the radio frame #2, the UE 108 performs HARQ ACK/NACK according to timing for the TDD UL-DL configuration 0. In this manner, the UE 108 determines TDD UL-DL configuration applicable during the radio frame #2.

The above process is repeated when the UE 108 wakes up from a period of inactivity of the DRX cycle a next time. For example, the UE 108 wakes up in the subframe #3 (SF #3) of the radio frame #3, which is an ambiguous type subframe and determines the category of subframe #3 as a flexible subframe. According to the intersection operation rule to identify PDCCH subframe, the UE 108 does not monitor the PDCCH during the subframe #3 and the subframe #4 as the subframe #3 and subframe #4 are not identified as PDCCH subframe but counts the subframe #3 and subframe #4 towards the on duration timer of the configured DRX cycle. The UE 108 monitors PDCCH during the subframe #5 and subframe #6, according to the intersection operation, as the subframe #5 and the subframe #6 are fixed subframes of DL and special type, respectively, as shown in FIG. 5. Consider that the UE 108 receives a new DCI format or DL assignment message on PDSCH along with TDD Configuration MAC CE containing TDD UL-DL configuration (e.g., configuration 1) applicable for the radio frame #3 or just the TDD Configuration MAC CE message containing TDD UL-DL configuration. Based on the TDD UL-DL configuration 1, the UE 108 monitors PDCCH during the remaining period of activity and performs counting of DRX timers accordingly.

Figure 6:
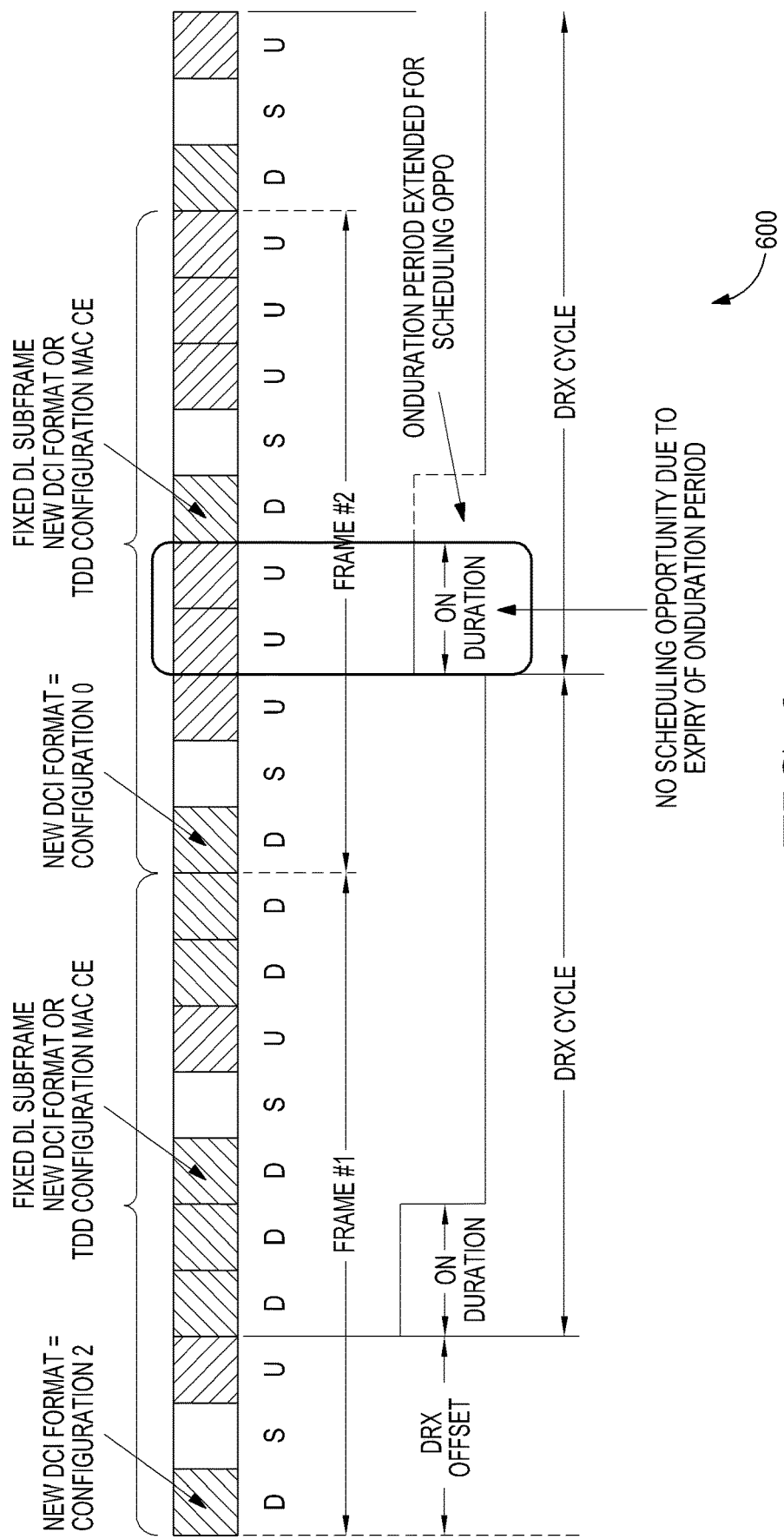
FIG. 6 is a diagram illustrating extending an on duration timer of a DRX cycle to determine a TDD UL-DL configuration applicable for a current radio frame, according to an embodiment of the present invention.

FIG. 6 is a diagram 600 illustrating extending an on duration timer of a DRX cycle to determine TDD UL-DL configuration applicable for a current radio frame, according to an embodiment of the present invention. Consider that, for dynamic reconfiguration, TDD UL-DL configurations 2, 0, and 1 are configured for radio frames 1, 2 and 3, respectively. For the purpose of illustration, consider that a DRX start offset is equal to 3 ms, an ON duration timer is equal to 2 ms, a DRX cycle is 10 ms in length, and a DRX inactivity timer is equal to 0 ms.

According to the configured DRX cycle, the UE 108 wakes up from a period of inactivity in subframe #3 of a radio frame #2. Also, the UE 108 is not aware of a TDD UL-DL configuration applicable for the radio frame #2. It can be seen from a schematic representation in FIG. 6 that subframe #3 and subframe #4 are coinciding with period of activity of the DRX cycle, and the on duration timer expires at the end of SF #4. Further, the UE 108 determines that the subframe #3 and subframe #4 are flexible subframes. The UE 108 monitors PDCCH during the subframe #3 and the subframe #4 and counts the flexible subframes towards the on duration timer during the period of activity. Consider that the UE 108 has not received TDD UL-DL configuration applicable for the radio frame #2 in the subframe #3 and the subframe #4.

As the on duration timer expires at the end of subframe #4 and the UE 108 did not receive a new DCI format or DL assignment message during the subframe #3 and the subframe #4 of the radio frame #2, the UE 108 extends the on duration timer for a duration of 1 ms as the subframe #5 is a fixed subframe. In an embodiment of the present invention, the eNB 106 signals a new DCI format indicating a TDD UL-DL configuration applicable for a radio frame in a first half (e.g., subframe #0) and second half (subframe #5) of the radio frame. Thus, the UE 108 extends the on duration timer by lens as the UE 108 expects a new DCI format indicating a TDD UL-DL configuration applicable for the radio frame #2 in the subframe #5. Accordingly, the UE 108 monitors PDCCH during the subframe #5 and receives a new DCI format or a DL assignment message along with a TDD Configuration MAC CE indicating TDD UL-DL configuration applicable for the radio frame #2. A TDD Configuration MAC CE used for indicating TDD UL-DL configuration is shown in FIGS. 8A-8E. It can be noted that, the eNB 106 signals a TDD Configuration MAC CE indicating a TDD UL-DL configuration on a PDSCH of a DL subframe where the UE 108 is expected to wake up from a period of inactivity or ON duration timer is running. It can be noted that, the TDD Configuration MAC CE received on the PDSCH is addressed by PDCCH using C-RNTI.

Figure 7:
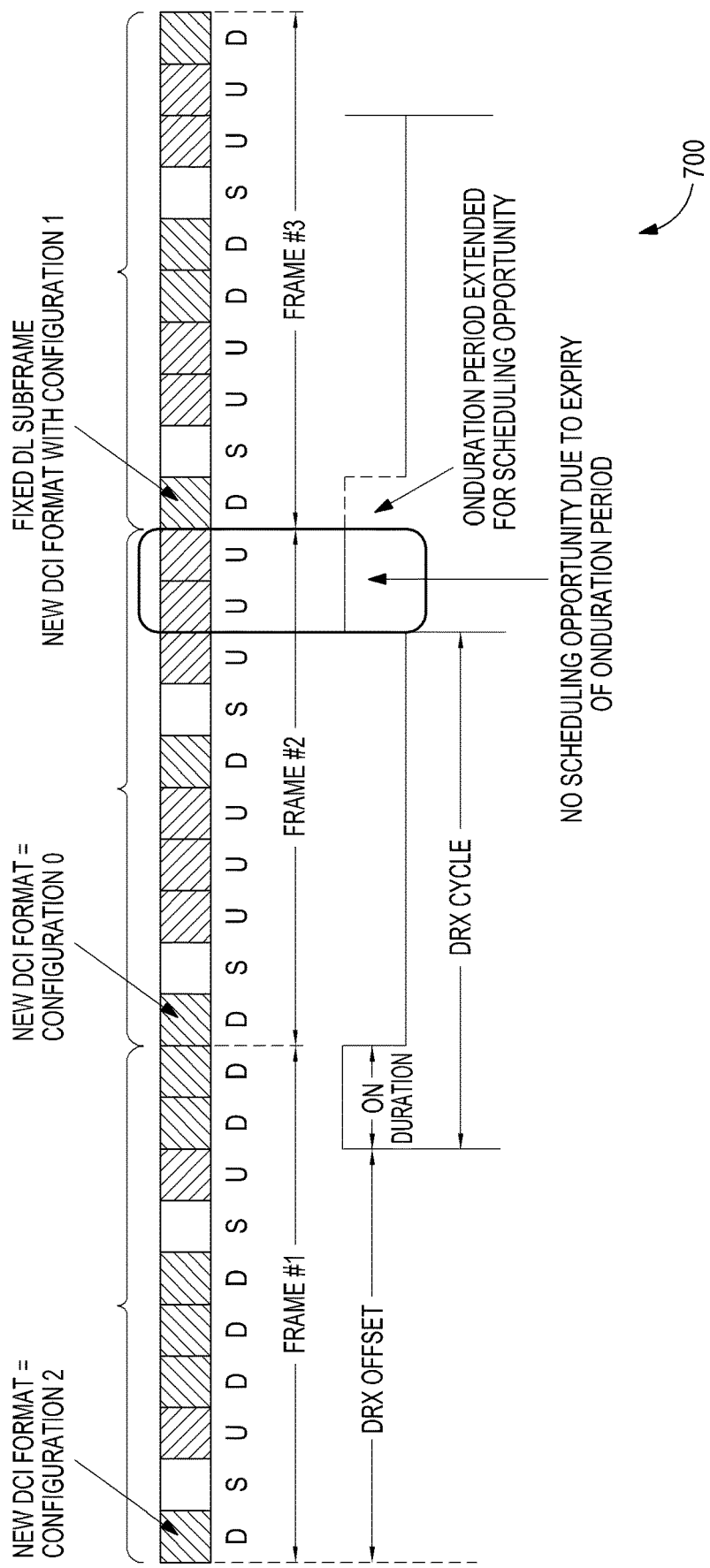
FIG. 7 is a diagram illustrating extending an on duration timer of a DRX cycle to determine a TDD UL-DL configuration applicable for a next radio frame, according to an embodiment of the present invention.

FIG. 7 is a schematic representation 700 illustrating extending the on duration timer of a DRX cycle to determine TDD UL-DL configuration applicable for a next radio frame. Consider that, for dynamic reconfiguration, TDD UL-DL configurations 2, 0, and 1 are configured for radio frames 1, 2 and 3, respectively. For the purpose of illustration, consider that a DRX start offset is equal to 8 ms, an ON duration timer is equal to 2 ms, a DRX cycle is 10 ms in length, and a DRX inactivity timer is equal to 0 ms.

Suppose the UE 108 wakes up from a period of inactivity in subframe #8 of a radio frame #2. Also, the LTE 108 is not aware of a TDD UL-DL configuration applicable for the radio frame #2. It can be seen from FIG. 7 that subframe #8 and subframe #9 are coinciding with period of activity of the DRX cycle and the on duration timer expires at the end of SF #9. Further, the UE 108 determines that the subframe #8 and subframe #9 are flexible subframes. The UE 108 monitors PDCCH during the subframe #8 and the subframe #9 and counts the flexible subframes towards the on duration timer during the period of activity. Consider that the UE 108 has not received TDD UL-DL configuration applicable for the radio frame #2 in the subframe #8 and the subframe #9.

As the on duration timer expires at the end of subframe #9 and the UE 108 did not receive a new DCI format or DL assignment message during the subframe #8 and the subframe #9 of the radio frame #2, the UE 108 extends the on duration timer for 1 ms duration as subframe #0 of a radio frame #3 is a fixed subframe. Since the eNB 106 signals a new DCI format indicating a TDD UL-DL configuration applicable for a radio frame in a first half (e.g., subframe #0) and second half (subframe #5) of the radio frame, the UE 108 extends the on duration timer by 1 ms, as the UE 108 expects a new DCI format indicating a TDD UL-DL configuration applicable for the radio frame #3 in the subframe #0. Accordingly, the UE 108 monitors PDCCH during the subframe #0 and receives a new DCI format or DL assignment message along with a TDD Configuration MAC CE indicating TDD UL-DL configuration applicable for the radio frame #3.

FIGS. 8A-8E are diagrams illustrating TDD Configuration MAC CE formats carrying TDD UL-DL configuration applicable for a current radio frame and/or subsequent radio frame, according to an embodiment of the present invention. The eNB 106 communicates a TDD UL-DL configuration applicable for a radio frame in a TDD Configuration MAC CE depicted in FIGS. 8A-8E instead of a new DCI format when a medium to slow reconfiguration in order of few hundreds of milliseconds is desired.

FIG. 8A is a diagram illustrating various fields of a TDD Configuration MAC CE 800, according to an embodiment of the present invention. In FIG. 8A, the TDD Configuration MAC CE 800 includes reserved fields 802A-802C, a TDD configuration field 804, and a validity timer 806, The TDD configuration field 804 indicates a TDD UL-DL configuration applicable for a current radio frame. For example, the TDD configuration field 804 indicates which TDD UL-DL configuration out of the indicated set of TDD UL-DL configuration is configured for the current radio frame. For example, if the TDD UL-DL configuration 0 is configured for the current radio frame, the TDD configuration field 804 indicates '000'. The validity timer field 806 indicates a time period for which the TDD UL-DL configuration indicated by field 804 is applicable for one or more radio frames. For example, the validity timer value may be equal to 320 ms, 640 ms, 1280 ms, and 2560 ms.

Referring to FIG. 8B, a TDD Configuration MAC CE 810 includes reserved fields 812A-812B, and TDD configuration fields 814A-814B. The TDD configuration field 814A indicates a TDD UL-DL configuration applicable for a current radio frame. The TDD configuration field 814B indicates a TDD UL-DL configuration application for a subsequent radio frame(s).

Referring to FIG. 8C, a TDD Configuration MAC CE 820 is similar to the TDD Configuration MAC CE 800 of FIG. 8A, except the TDD Configuration MAC CE 820 includes an additional SFN field 822 of 2 bits. The SFN field 822 indicates an absolute SFN start value for when the UE 108 has applied a TDD UL-DL configuration indicated in the TDD configuration field 804. For example, the 2 bit SFN start value may be {SFN0, SFN256, SFN 512, SFN768}.

Figure 8D:
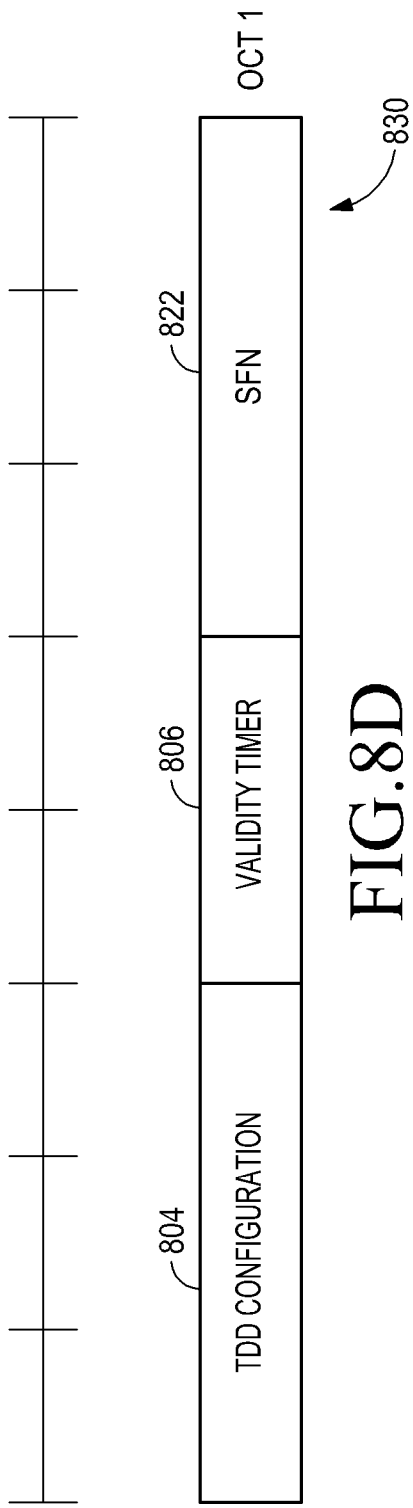
Figure 8E:
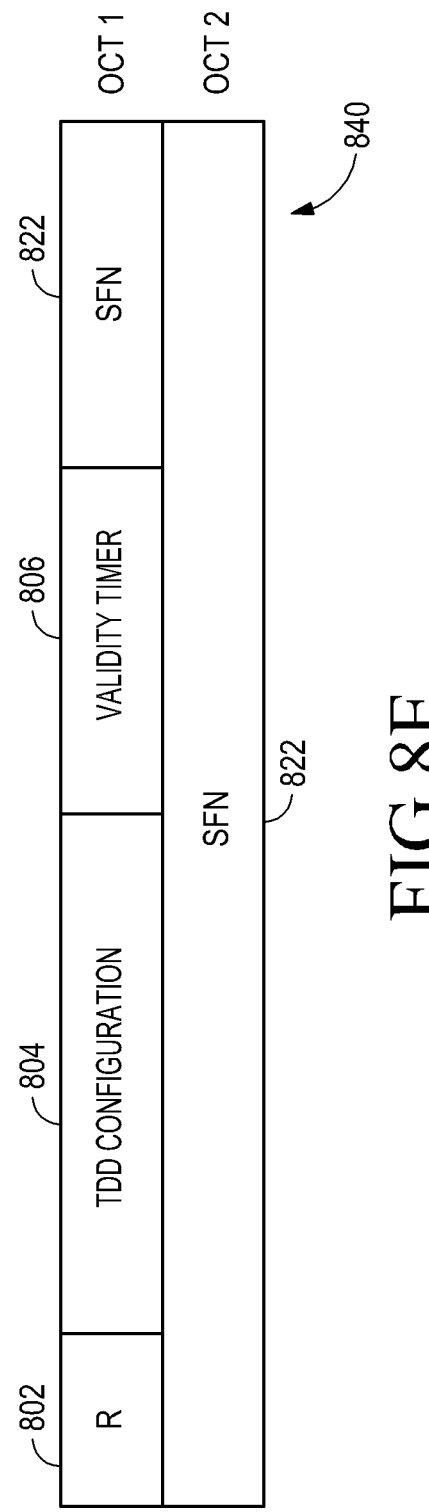

Referring to FIG. 8D, a TDD Configuration MAC CE 830 is similar to the TDD Configuration MAC CE 820 of FIG. 8C, except the TDD Configuration MAC CE 830 includes an SFN field 822 of 3 bits. For example, the 3 bit SFN start value may be {SFN0, SFN128, SFN256, SFN384, SFN 512, SFN640, SFN768, SFN896}.

Referring to FIG. 8D, a TDD Configuration MAC CE 840 is similar to the TDD Configuration MAC CE 820 of FIG. 8C, except the TDD Configuration MAC CE 840 includes an SFN field 822 of 10 bits. The values for the validity timer and the SFN are provided as examples and not the limiting case.

In additional embodiments of the present invention, the UE 108 may perform Radio Resource Management (RRM)/Radio Link Monitoring (RLM)/Channel State Information (CSI) measurements during fixed subframe(s) of downlink or special type for maintaining accuracy of measurements.

Figure 9:
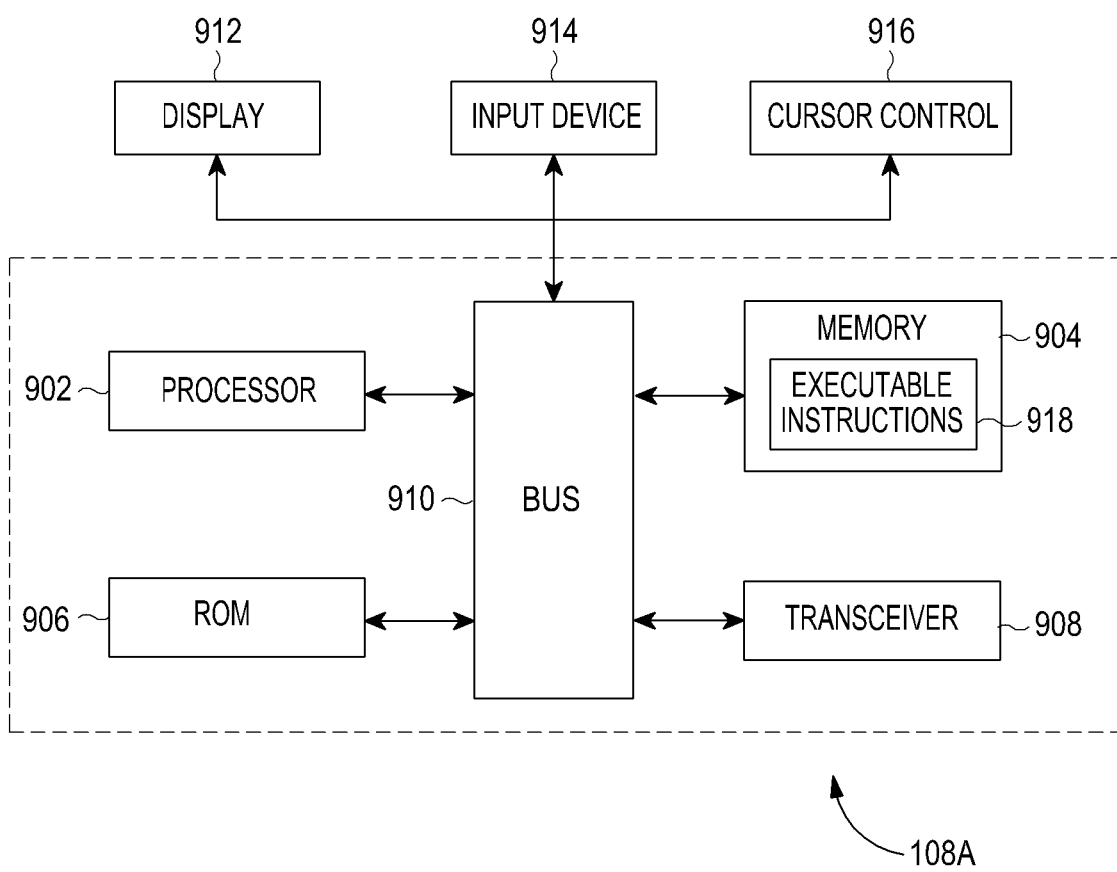
FIG. 9 is a block diagram illustrating a UE, according to an embodiment of the present invention.

FIG. 9 is a block diagram illustrating a UE, according to an embodiment of the present invention. In FIG. 9, the UE 108A includes a processor 902, a memory 904, a Read Only Memory (ROM) 906, a transceiver 908, a bus 910, a display 912, an input device 914, and a cursor control 916.

The processor 902, as used herein, refers to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 902 may also include embedded controllers, such as generic or programmable logic devices or arrays, application specific integrated circuits, single-chip computers, smart cards, and the like.

The memory 904 and the ROM 906 may be a volatile memory and a non-volatile memory. The memory 904 includes executable instructions 918, which when executed by the processor 902, causes the processor 902 to perform method steps, according to one or more embodiments of the present invention, as described in FIGS. 3 to 7. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like.

Embodiments of the present invention may be implemented in conjunction with modules, including functions, procedures, data structures, and application programs, for performing tasks, or defining abstract data types or low-level hardware contexts. The executable instructions 918 may be stored on any of the above-mentioned storage media and may be executable by the processor 902. For example, a computer program may include the executable instructions 918, that when executed by the processor 902, cause the processor 902 to perform method steps according to the described embodiments of the present invention. In an embodiment of the present invention, the computer program may be included on a Compact Disc-ROM (CD-ROM) and loaded from the CD-ROM to a hard drive in the non-volatile memory.

The bus 910 acts as interconnect between various components of the user equipment 108. The components, such as the transceiver 908, the display 912, the input device 914, and the cursor control 916, are well known to the person skilled in the art.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for monitoring a physical downlink control channel (PDCCH) by a user equipment (UE) in a wireless communication system, the method comprising:
   receiving, by the UE, a system information block (SIB) from a base station;
   obtaining, by the UE, a first time division duplex (TDD) uplink (UL)/downlink (DL) configuration from the SIB;
   identifying, by the UE, DL subframes indicated by the obtained first TDD UL/DL configuration;
   monitoring, by the UE, the PDCCH transmitted from the base station on a DL subframe included in an on duration period of a discontinuous reception (DRX) cycle among the DL subframes;
   obtaining, by the UE, information about a second TDD UL/DL configuration from the monitored PDCCH; and
   applying, by the UE, the second TDD UL/DL configuration to one or more radio frames based on the obtained information,
   wherein the DL subframe corresponds to a predetermined subframe number, and
   wherein the on duration period represents a period corresponding to a predetermined number of subframes from a subframe where the DRX cycle starts, and the on duration period is repeated periodically.

2. The method of claim 1, further comprising:
   performing one of radio resource management (RRM) measurements and radio link monitoring (RLM) measurements during the on duration period of the DRX cycle.

3. The method of claim 1, wherein the PDCCH is monitored based on an identifier of the UE.

4. The method of claim 1, wherein the predetermined subframe number is a subframe #0.

5. A method for transmitting information for monitoring a physical downlink control channel (PDCCH) by a base station (BS) in a wireless communication system, the method comprising:
   transmitting, by the BS, to a user equipment (UE), a system information block (SIB) including a first time division duplex (TDD) uplink (UL)/downlink (DL) configuration; and transmitting, by the BS, to the UE, information about a second TDD UL/DL configuration to be applied to one or more radio frames through the PDCCH on a DL subframe, the DL subframe being one of DL subframes indicated by the first TDD UL/DL configuration, wherein the DL subframe corresponds to a predetermined subframe number, wherein the DL subframe is included in an on duration period of a discontinuous reception (DRX) cycle, and wherein the on duration period represents a period corresponding to a predetermined number of subframes from a subframe where the DRX cycle starts, and the on duration period is repeated periodically.

6. The method of claim 5, wherein one of radio resource management (RRM) measurements and radio link monitoring (RLM) measurements are performed by the UE during the on duration period of the DRX cycle.

7. The method of claim 5, wherein the PDCCH is monitored based on an identifier of the UE.

8. The method of claim 5, wherein the predetermined subframe number is a subframe #0.

9. A user equipment (UE) in a wireless communication system, the UE comprising:
   a transceiver configured to receive a system information block (SIB) from a base station; and
   at least one processor configured to:
      obtain a first time division duplex (TDD) uplink (UL)/downlink (DL) configuration from the SIB;
      identify DL subframes indicated by the obtained first TDD UL/DL configuration;
      monitor a physical downlink control channel (PDCCH) transmitted from the base station on a DL subframe included in an on duration period of a discontinuous reception (DRX) cycle among the DL subframes;
      obtain information about a second TDD UL/DL configuration from the monitored PDCCH; and
      apply the second TDD UL/DL configuration to one or more radio frames based on the obtained information,
   wherein the DL subframe corresponds to a predetermined subframe number, and
   wherein the on duration period represents a period corresponding to a predetermined number of subframes from a subframe where the DRX cycle starts, and the on duration period is repeated periodically.

10. The UE of claim 9, wherein the at least one processor is further configured to:
    perform one of radio resource management (RRM) measurements and radio link monitoring (RLM) measurements during the on duration period of the DRX cycle.

11. The UE of claim 9, wherein the PDCCH is monitored based on an identifier of the UE.

12. The UE of claim 9, wherein the predetermined subframe number is a subframe #0.

13. A base station (BS) in a wireless communication system, the BS comprising:
    a transceiver; and
    at least one processor configured to control the transceiver to:
       transmit, to a user equipment (UE), a system information block (SIB) including a first time division duplex (TDD) uplink (UL)/downlink (DL) configuration; and
       transmit, to the UE, information about a second TDD UL/DL configuration to be applied to one or more radio frames through a physical downlink control channel (PDCCH) on a DL subframe, the DL subframe being one of DL subframes indicated by the first TDD UL/DL configuration,
    wherein the DL subframe corresponds to a predetermined subframe number,
    wherein the DL subframe is included in an on duration period of a discontinuous reception (DRX) cycle, and
    wherein the on duration period represents a period corresponding to a predetermined number of subframes from a subframe where the DRX cycle starts, and the on duration period is repeated periodically.

14. The BS of claim 13, wherein one of radio resource management (RRM) measurements and radio link monitoring (RLM) measurements are performed by the UE during the on duration period of the DRX cycle.

15. The BS of claim 13, wherein the PDCCH is monitored based on an identifier of the UE.

16. The BS of claim 13, wherein the predetermined subframe number is a subframe #0.

* * * * *